United States Patent
Lowe et al.

(10) Patent No.: US 7,327,405 B1
(45) Date of Patent: Feb. 5, 2008

(54) SYSTEMS AND METHODS FOR IMPROVED VIDEO COMB FILTERING WITH DYNAMIC CHROMA BANDWIDTH CONTROL

(75) Inventors: Virgil L. Lowe, Roswell, GA (US); Xavier Jacques Lacarelle, Paris (FR)

(73) Assignee: QuStream Corporation, Toronto, Ontario (CA)

( * ) Notice: Subject to any disclaimer, the term of this patent is extended or adjusted under 35 U.S.C. 154(b) by 423 days.

(21) Appl. No.: 10/818,011

(22) Filed: Apr. 5, 2004

Related U.S. Application Data

(60) Provisional application No. 60/460,473, filed on Apr. 4, 2003.

(51) Int. Cl.
*H04N 9/77* (2006.01)
(52) U.S. Cl. .............. 348/663; 348/665; 348/667; 348/669
(58) Field of Classification Search ............. 348/663, 348/665, 667, 669, 670, 450–452; *H04N 9/77, H04N 9/78*
See application file for complete search history.

(56) References Cited

U.S. PATENT DOCUMENTS

| | | | |
|---|---|---|---|
| 3,542,945 A | 11/1970 | Parker | |
| 3,860,952 A | 1/1975 | Tallent et al. | |
| 4,240,105 A | 12/1980 | Faroudja | |
| 4,297,728 A | 10/1981 | Lowe | |
| 5,097,321 A * | 3/1992 | Stern et al. | 348/450 |
| 5,204,787 A | 4/1993 | Suzuki et al. | |
| 5,282,038 A | 1/1994 | Lowe | |
| 5,303,061 A | 4/1994 | Matsumoto et al. | |
| 5,359,366 A | 10/1994 | Ubukata et al. | |
| 5,373,327 A | 12/1994 | McGee et al. | |
| 5,398,079 A | 3/1995 | Liu et al. | |
| 5,424,784 A | 6/1995 | Raby | |
| 5,424,849 A | 6/1995 | Yamashita et al. | |
| 5,452,006 A | 9/1995 | Auld | |
| 5,461,487 A | 10/1995 | Asakura | |
| 5,526,060 A | 6/1996 | Raby | |
| 5,614,952 A | 3/1997 | Boyce et al. | |
| 5,663,771 A | 9/1997 | Raby | |
| 5,686,965 A | 11/1997 | Auld | |

(Continued)

FOREIGN PATENT DOCUMENTS

| WO | WO 9205663 | 4/1992 |
|---|---|---|

(Continued)

OTHER PUBLICATIONS

Lowe, Virgil, Comb Filter Concepts, Problems and Solutions, Jun. 20, 2000, http://www.forteldtv.com.

(Continued)

*Primary Examiner*—Trang U. Tran
(74) *Attorney, Agent, or Firm*—Kilpatrick Stockton LLP

(57) ABSTRACT

The invention provides improved video comb filtering. One aspect of the invention considers detected motion of an object between a reference signal and a comparison signal in determining whether to comb and if combing is indicate, what portion of each of the signals to use for combing. Another aspect of the invention detects non-coherent combing decisions and eliminates the non-coherency. Yet another aspect of the invention uses luma bandwidth reduction and/or chroma bandwidth reduction in the case of a comb failure.

17 Claims, 12 Drawing Sheets

U.S. PATENT DOCUMENTS

| | | |
|---|---|---|
| 5,727,091 A | 3/1998 | Kinouchi et al. |
| 5,742,784 A | 4/1998 | Potter et al. |
| 5,784,120 A | 7/1998 | Cummins et al. |
| 5,805,238 A | 9/1998 | Raby et al. |
| 6,278,495 B1 * | 8/2001 | Lowe et al. ............... 348/665 |
| 6,300,985 B1 | 10/2001 | Lowe et al. |
| 6,462,790 B1 | 10/2002 | Lowe et al. |
| 6,809,778 B2 * | 10/2004 | Shibutani et al. ........... 348/667 |
| 6,956,620 B2 * | 10/2005 | Na ............................. 348/663 |

FOREIGN PATENT DOCUMENTS

| | | |
|---|---|---|
| WO | WO 0054515 | 9/2000 |
| WO | WO 0054516 | 9/2000 |
| WO | WO 0054519 | 9/2000 |
| WO | WO 0215593 | 2/2002 |

OTHER PUBLICATIONS

Lowe, Virgil, Resolving Video Quality Problems in Hybrid A/D Installations by Using the FS-412 Dual Path Video Synchronizer - Composite and Component Paths, Mar. 19, 2001, http://www.forteldtv.com.

Author Unknown, Fortel DTV Extends Integrity™ Product Line with New Video Synchronizer and Control Panel, Apr. 8, 2002 (printed from website on Nov. 26, 2002), p.1, http://www.forteldtv.com/news_ article5.asp.

Rogers, Greg, Video Signal Formats, Jan. 26, 1998, http://www.cybertheater.com/Tech_ Archive/YC_ Comp Format/yc_ comp_ format.html.

Rogers, Greg, Guide to Comb Filters: Y/C Separation, Jan. 26, 1998, http://www.cybertheater.com/Tech_ Reports/Comb_ itter_ Tut/guide_ comb_ filters.html.

* cited by examiner

Band-split filters: NTSC (206, 218) and PAL (208, 220)
(210 and 222 are the subcarrier frequencies)

Notch filter (306, 318), ComplNotch filter (308, 320)

SYSTEMS AND METHODS FOR IMPROVED VIDEO COMB FILTERING WITH DYNAMIC CHROMA BANDWIDTH CONTROL

RELATED APPLICATION

This application claims priority to U.S. Provisional Application Ser. No. 60/460,473, entitled "Systems and Methods for Improved Video Comb Filtering with Dynamic Chroma Bandwidth Control" filed Apr. 4, 2003, which is incorporated herein by reference.

FIELD OF THE INVENTION

This invention is directed to systems and methods that enhance video signal performance, and more particularly relates to systems and methods that improve video comb filtering by enhancing the dynamic chroma bandwidth control of a video signal.

BACKGROUND OF THE INVENTION

Conventional comb filters have been used to separate composite video signals into respective luminance (hereinafter "luma") and chrominance (hereinafter "chroma") signal components. Typically, comb filters use the inherent characteristics of at least one video signal standard such as NTSC (National Television Standards Committee) or PAL (Phase Alternate Line) to accomplish this separation. In the NTSC standard, chroma is modulated on a subcarrier at approximately 3.579545 Megahertz (MHz). This frequency was chosen because it creates 455 half cycles of subcarrier every line. Therefore, the subcarrier is inverted on every other video line. A two-line comb filter adds two adjacent lines to cancel the chroma, resulting in extraction of the luma and/or subtracts two adjacent lines to cancel the luma, resulting in extraction of the chroma. This processing causes a half line of delay in the chroma signal and high frequency luma. A three-line comb filter adds the line above and below the center line, divides by two, and then subtracts the result from the center line to extract chroma or adds the result to the center line to cancel chroma and to extract luma. A common alternative is to subtract the combed chroma from the composite signal to provide luma.

This process works as long as the lines have the same chroma and high frequency luma values. Adding adjacent lines that are not equal in chroma hue and amplitude does not cancel the subcarrier completely which produces an artifact commonly known as "hanging dots." The most common fix for this artifact is to switch or "adapt" from comb filter mode back to a band-pass filter to remove the subcarrier and most of the offending sidebands. However, adapting to a band-split filter to separate luma and chroma causes several other problems. These problems include reduced luma resolution and "cross color artifacts" caused by passing high frequency luminance into the chroma path. There are other difficulties in separating the luma and chroma signal components from a composite NTSC and/or PAL video signal. For instance, conventional comb filters have residual artifacts that reduce picture quality and make the resultant video more difficult to compress and to transmit.

PAL is somewhat different than NTSC since it has a 90 degree shift per line requiring 2 lines of delay instead of one to achieve a 180 degree inversion of the subcarrier. Comb filter rules still apply to signals in the PAL standard, and the primary artifacts are still resolution loss, cross-color and hanging dots.

Recent improvements in comb filters are designed to reduce artifacts. Improvements such as those disclosed in U.S. Pat. No. 6,278,495 B1 to Lowe, et al., incorporated herein by reference, relate to multiple directions to comb to reduce artifacts. Further, U.S. Pat. No. 6,462,790 B1 to Lowe, et al., incorporated herein by reference, relates to another improvement in the reduction of artifacts by dynamically controlling the adaptation threshold. However, these improvements do not address cross color artifacts passed in adaptation to band split mode.

Typically, conventional comb filters that are designed for broadcast and video production applications have a wide frequency response that is greater than 4.2 MHz for luma and 1.2 MHz for chroma to take advantage of all of the luma and chroma resolution present in the input signal. Lab experiments with a wide variety of video signals have shown wide chroma bandwidth filters provide relatively better chroma resolutions and a visually sharper picture in most video scenes, however, some of the experiments revealed a conflict in bandwidth requirements. Some picture material causes cross color artifacts in some video scenes that cannot be eliminated by a comb filter but can be eliminated by reducing the chroma bandwidth. Consumer televisions typically do not normally have flat bandwidth filters that are used for broadcast applications. Instead, they typically use inexpensive filters that have less bandwidth. These types of filters do not provide the same resolution performance as flat filters but reduce some of the cross color artifacts as a byproduct of a lower pass band.

Therefore, a need exists for systems and methods for improving video comb filtering with dynamic control of the chroma bandwidth of the video signal.

SUMMARY OF THE INVENTION

Systems and methods according to various aspects and embodiments according to the invention address some or all of these issues and combinations of them. They do so by providing a combination of video comb filter enhancements that reduce cross color artifacts, hanging dots, chroma smear, loss of luma resolution and motion artifacts. According to one aspect of the invention, a method implemented with a comb filter reduces motion artifacts in the frame comb portion of 3D comb filters. This method uses two frames of video delay to improve motion detection and to provide an input to the dynamic chroma bandwidth control based on any detected motion.

According to another aspect of the invention, a method implemented with a comb filter reduces hanging dots, cross color artifacts, loss of luma resolution and chroma smear in the line comb filter portion of a 2D or 3D comb filter. This method can use 5 lines of video taps to enhance the adaptation from 3 line comb to the best of 2 lines and to provide additional inputs to the dynamic chroma bandwidth control. According to another aspect of the invention, any non-coherent combing decisions are detected and eliminated to improve combing results.

According to another aspect of the invention, a method dynamically reduces chroma bandwidth which reduces cross color artifacts and preserves the maximum chroma bandwidth when possible. This method can be utilized with both 2D and 3D-type comb filters. This method can be implemented with two or more low pass filters following a luma/chroma separation and R-Y and B-Y chroma demodulators. A selector switch can be used to select the desired low pass filter as determined by chroma bandwidth selection control logic. The method can be implemented in a system such as the Composite Video Decoder described in U.S. Pat. No. 6,300,985 B1 including its Digital Comb Filter described in U.S. Pat. No. 6,278,495 B1, or can also be utilized in conjunction with other video comb filter devices, techniques, and methods.

The method according to this aspect of the invention utilizes circuitry that can have two or more filters with different bandwidth characteristics and control circuitry for dynamically selecting the proper filter for a group of pixels associated with a video signal. A benefit of the method is that it passes full chroma resolution in most video signals that comb well and reduces cross color artifacts by reducing chroma bandwidth only when necessary. The result is a relatively pleasing picture with increased luma and chroma resolution in almost all of the picture and relatively fewer cross color artifacts in areas of the picture where typical comb filters usually have problems separating luma and chroma correctly. Furthermore, the method can be used in conjunction with an enhancement circuit that utilizes a limited bandwidth chroma path to regain apparent chroma resolution without substantially affecting the purity of the full bandwidth chroma path. The chroma enhancement circuit can use edges of the luminance signal to enhance the chroma edges or can use a conventional enhancement technique.

The method according to this aspect of the invention also has another benefit of reducing the number of bits necessary to achieve a given quality level of MPEG video compression. This bit rate reduction provides cable television transmission or satellite transmission of more channels over a fixed bandwidth or improved video quality with a fixed number of channels and transmission bandwidth. The reduction also improves the picture quality and the storage efficiency in digital recorders and servers.

In another aspect of the invention, a method dynamically reduces luma bandwidth which reduces hanging dots. This method can be implemented with a trap filter or one or more bandsplit filters following a luma/chroma separation. A cross fade circuit can be used to select the desired luma signal as determined by luma bandwidth selection control logic.

Other objects, features and advantages will become apparent with respect to the remainder of this document.

BRIEF DESCRIPTION OF THE DRAWINGS

The accompanying drawings, which are incorporated in and form a part of the specification, illustrate preferred embodiments of the invention and, together with the description, disclose the principles of the invention. In the drawings.

DETAILED DESCRIPTION OF EMBODIMENTS

Reference will now be made in detail to preferred embodiments of the invention, non-limiting examples of which are illustrated in the accompanying drawings.

The invention is directed to systems and methods for enhancing the dynamic chroma bandwidth control of a video signal. The invention is also directed to systems and methods for enhancing luminance and chrominance components of a video signal.

A digital video comb filter according to an aspect of the invention is an enhancement for improving luminance (hereinafter "luma") and chrominance (hereinafter "chroma") component signal separation, reducing hanging dots and cross color artifacts. In the embodiment shown in FIG. 1, the comb filter uses five lines of video to improve line combing and a second frame of video delay to improve frame combing. According to another aspect of the invention, the comb filter uses multiple filters to reduce the bandwidth of luma to reduce the bandwidth of chroma as required. In yet another aspect of the invention, the comb filter provides logic that controls the selection of the filters. In yet another aspect of the invention, control logic enhancements improve the ability of the comb filter to choose an optimum way of combing to minimize hanging dots and cross color artifacts.

Figure 1:
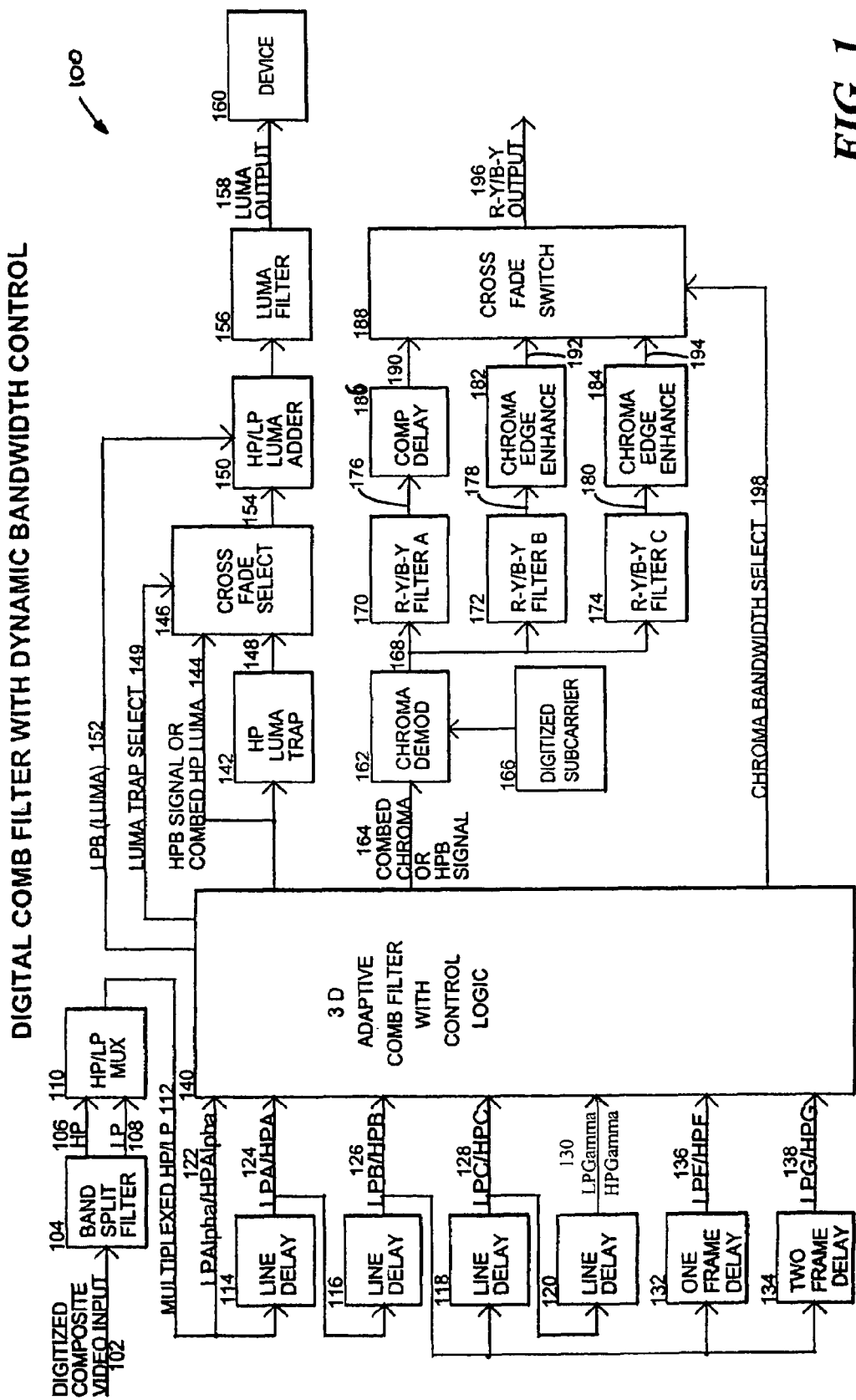
FIG. 1 is a functional block diagram of an embodiment of an exemplary system in accordance with the invention.

FIG. 1 is a functional block diagram of an exemplary comb filter system 100 in accordance with various embodiments of the invention. The system 100 is adapted to enhance the luminance and chrominance components of a video signal, and to process a composite video input signal 102 for transmission to a device 160 such as a downstream video display and/or broadcast equipment. A device 160 can include, but is not limited to, video recorders, time base correctors (TBCs), video decoders, video synchronizers, video monitors and displays, Moving Picture Experts Group (MPEG) and Joint Photographic Experts Group (JPEG) compressors, video servers, video tape recorders (VTRs), personal video recorders (PVRs), switchers, processors, digital televisions, home theater equipment, digital-to-analog converters, multiplexers and other video devices. Note that one skilled in the art will recognize the various applications of the invention with these and similar types of video display and broadcast equipment.

In the embodiment shown a composite video input signal 102 is an input to the comb filter system 100. A conversion accuracy of approximately twelve bits is preferred for most broadcast applications and equipment; however, an accuracy of 8 to 10 bits is sufficient for most consumer video applications and equipment.

A band-split filter 104 receives the video input signal 102, and separates the video input signal 102 into a high pass (HP) video signal 106 and a low pass (LP) video signal 108. In an embodiment, a crossover frequency can be selected to pass a portion of the chroma signal and some or all associated sideband signals in the HP video signal 106, while passing some or all of the luma signal without passing the subcarrier or its associated sideband signals in the LP video signal 108. For example, the crossover frequency is typically set at approximately 2.0 Megahertz (MHz) for a NTSC-type standard and approximately 3.0 MHz for a PAL-type standard.

A multiplexer (HP/LP MUX) 110 receives both the HP video signal 106 and LP video signal 108 from the band-split filter 104, and in turn, combines the HP and LP video signals 106 and 108 into a multiplexed (HP/LP) data stream 112, such as a multiplexed, time-sequenced data stream. In another embodiment, a device and/or associated method can generate a wider data word with the HP video signal 106 and LP video signal 108 in parallel orientation. In yet another embodiment that is better suited for Application Specific Integrated Circuit (ASIC)-type equipment, the composite video input signal 102 is processed through a series of line and frame delays and respective band-split filters.

In any event, from the multiplexer 110, some or all of the multiplexed HP/LP data stream 112 is received by at least one line delay 114. The line delay can be one in a series of multiple line delays 114, 116, 118, and 120. Each line delay 114, 116, 118, and 120 is adapted to generate a time delay for a respective video line. In the embodiment shown in FIG. 2, the line delays 114, 116, 118, and 120 generate a predetermined time delay for a particular or selected video line, such as a "center line." Generally, any type of suitable memory such as digital memory can be used for each of the line delays 114, 116, 118, and 120. A preferred embodiment utilizes memory blocks in a FPGA (Field Programmable Gate Array) to implement the line delays 114, 116, 118, and 120. In another embodiment, line delays can be used in ASIC-type equipment that can be incorporated into consumer video devices, such as televisions, and in other video displays that are used in cable television, satellite transmission, and broadcast and professional video applications. In any event, the line delays 114, 116, 118, and 120 can be used to provide multiple lines of video at predetermined times that can be aligned in horizontal timing with a particular or selected video line, such as a center line.

For example in FIG. 1, the a portion of the multiplexed HP/LP data stream 112 bypasses line delays 114, 116, 118, and 120, and is designated "line Alpha" 122. Another portion of the multiplexed HP/LP data stream 112 is processed by respective line delays 114, 116, 118, and 120 which generate respective video lines designated as "line A" 124, "line B" 126, "line C" 128, and "line Gamma" 130. In this example, each of the video lines 122, 124, 126, 128, and 130 is a multiplexed signal of HP and LP video signals. Line B (LPB/HPB) 126 is considered to be the "center line" or reference line for processing of the multiplexed data stream 112. Line A (LPA/HPA) 124 is advanced one line in time with respect to the center line, or Line B 126. Likewise, line Alpha (LPAlpha/HPAlpha) 122 is advanced two lines in time with respect to the center line, or line B 126. Conversely, line C (LPC/HPC) 128 is delayed one line in time with respect to the center line, or line B 126. Further, line Gamma (LPGamma/HPGamma) 130 is delayed two lines in time with respect to the center line, or line B 126. Fewer or greater numbers of line delays can be implemented in accordance with the scope of the invention.

The center line, line B 126, is input to at least one video frame delay. In the example shown in FIG. 1, the video frame delay is a series of video frame delays 132 and 134. Each video frame delay 132 and 134 is adapted to generate a time delay for at least one frame. Generally, any type of suitable memory such as digital memory can be used for the frame delays 132 and 134.

In the example shown in FIG. 1, at least two video frame delays 132 and 134 each provide a multiplexed signal of HP and LP video signals corresponding to one frame of time delay, designated as "frame F" (LPF/HPF) 136, and "frame G" (LPG/HPG) 138 respectively. The frame delays 132 and 134 are two separate read/write memories which can be simultaneously read from, simultaneously written to, or alternating reading of data from one memory and writing data to the other memory. In this manner, at least one frame delay can be reading data that is one frame "old" while the other frame delay can be reading data that is two frames "old." The timing for reading data from and writing data to the frame delays 132 and 134 can be predetermined or otherwise controlled so that both the frame delays 132 and 134 consistently provide data that is aligned vertically and horizontally to match the data from the center line, i.e. line B 126. In an alternative embodiment, a single frame delay could generate two or more frames of time delay. Furthermore, a plurality of frame delays can generate a corresponding number of delayed frames in accordance with various embodiments of the invention.

An alternate method delays the composite video signal 102 before the band split filter 104 by one frame plus 2 lines; or alternatively, adds the LP and HP signals from the center line B signal 126 and delays by one frame. This alternative method uses relatively less memory so it is preferable for ASIC applications where memory is more expensive than logic elements. Note that when the composite signal is delayed, a band split filter may be placed after the first frame delay 132 so that the comb logic 140 receives the LPF and HPF separated signals.

Each of the video lines 124, 126, 128, and 130 from the corresponding line delays 114, 116, 118, and 120, as well as video line 122, and the video frames 136 and 138 from the corresponding frame delays 132 and 134 are further processed by an adaptive comb filter 140. The adaptive comb filter 140 is adapted to separate the luma and chroma signal components by using a comb-type logic. Typically, a comb-type logic can be applied by the adaptive comb filter 140 utilizing a series of adders and/or subtractors that separate and process the luma and chroma signal components. The comb-type logic is further described with respect to FIGS. 4-6, 9-16, and 18 which describe various comparisons performed between the processed line B (LPB/HPB 126) and the other respective LPX/HPX lines 122, 124, 128, 130, 136 and 138.

Furthermore, the adaptive comb filter 140 can apply control logic to select at least one luma and/or chroma filter when needed. In the embodiment shown in FIG. 1, the control logic can control selection of a HP luma trap filter 142 and one of the chroma low pass filters to the combed outputs 144, 164 of the comb filter 140.

As shown in FIG. 1, when called upon by the adaptive comb filter 140, the HP luma trap filter 142 receives an HP B luma signal or a combed luma HP B signal 144 from the adaptive comb filter 140. The HP luma trap filter 142 is centered on a subcarrier frequency and handles a luma output signal 144 from the adaptive comb filter 140 which is either the full bandwidth of the HP B luma signal or a combed HP B luma signal 144 from the adaptive comb filter 140 when the comb filter 140 cannot properly or correctly separate, or otherwise handle, the luma and chroma signals in the composite video input signal 102.

In this embodiment, the HP luma trap filter 142 is centered on a subcarrier frequency of approximately 3.58 MHz for a NTSC standard signal, or approximately 4.43 MHz for a PAL standard signal. The HP luma trap filter 142 filters the luma output signal 144 from the comb filter 140, which is either the HP B luma signal or combed luma HP B signal, and provides a trap filtered HP B luma signal 148 to a cross-fade circuit 146. In some instances, the comb-type logic of the adaptive comb filter 140 has an additional filter to reject a single pixel error in the video lines or video frames.

The cross-fade circuit 146 receives the trap filtered HP B luma signal 148 from the HP luma trap filter 142 and the luma output signal 144 from the comb filter 140. The cross-fade circuit 146 also receives a luma trap select signal 149 from the comb filter 140 for selecting or otherwise switching between the trap filtered HP B luma signal 148 or the luma output signal 144 from the comb filter 140. In this example, the cross-fade circuit 146 utilizes a series of multipliers and/or a switch to select between luma output signal 144 or the trap filtered HP B luma signal 148. A compensating delay (not shown) can also be used in the signal path of the luma output signal 144 so that luma output signal 144 and the trap filtered HP B luma signal 148 are synchronized in time at the inputs to the cross-fade circuit 146.

A HP/LP luma adder 150 follows the cross-fade circuit 146. The HP/LP luma adder 150 can take a sum of a LP B luma signal 152 from the adaptive comb filter 140 and a HP luma signal 154 from the cross-fade circuit 146. Typically, the HP/LP luma adder 150 can generate a sum that is a flat frequency response reproducing some or all of the luma frequencies in the composite video input signal 102 with an absence of some or all of the chroma signal component.

Optionally, a luma low pass filter 156 can follow the HP/LP luma adder 150 when the comb filter system 100 is used for some types of devices 160 such as video display devices or professional-type video devices. The luma low pass filter 156 can filter out all higher frequency harmonics and other out-of-band distortions. In any instance, an enhanced output luma signal 158 can be generated for use by the video-type or associated device 160.

As shown in FIG. 1, a chroma demodulation circuit 162 receives a chroma output signal 164 from the comb filter 140. The chroma output signal 164 comprises a combed chroma signal if the comb filter 140 is able to comb the composite video input signal 102 or comprises an HP B signal if the comb filter 140 is unable to comb the composite video input signal 102. The chroma demodulation circuit 162 includes an R-Y demodulator and a B-Y demodulator. Typically, the R-Y demodulator and B-Y demodulator utilize a multiplier to process two inputs, a chroma output signal 164 from the adaptive comb filter 140 and a synthesized subcarrier signal 166. Typically, the chroma output signal 164 is modulated on a standard-type signal, such as NTSC or PAL, with a subcarrier. The synthesized subcarrier signal 166 can be a digital subcarrier value previously stored in a lookup table, or associated storage or memory device. Any suitable device or method of generating a digital subcarrier value can be used in accordance with various embodiments of the invention. In any instance, values for the subcarriers are represented with approximately 90 degrees of separation in most instances. The input values are multiplexed over time, and the multiplier runs at twice the sample rate of the composite video signal input 102 so that one multiplier can perform the duties for both the R-Y demodulator and the B-Y demodulator. For those skilled in the art, this is commonly called "time-sharing," which reduces the amount of logic used for the digital signal processing, and thus reduces the overall cost of the system. The resulting output from the chroma demodulation circuit 162 is a time-multiplexed signal 168 representing an R-Y base-band signal and a B-Y base-band signal. The time multiplexed signal 168 contains the base-band signals plus the second harmonic of the subcarrier and its harmonics, which can be subsequently filtered to recover or otherwise obtain the original R-Y and B-Y signal values. In an alternative embodiment, separate R-Y and B-Y demodulators can be used, and the output signals multiplexed or sent to the next stage in parallel.

In any instance, the time-multiplexed signal 168 can be transmitted to at least one chroma low pass filter 170, 172 or 174. The chroma low pass filters 170, 172 or 174 are a series of chroma low pass filters, each adapted to receive the time-multiplexed signal 168 from the chroma demodulation circuit 162. Note that each filter 170, 172, and 174 is respectively labeled "R-Y/B-Y Filter A", "R-Y/B-Y Filter B", and "R-Y/B-Y Filter C". Each of the chroma low pass filters 170, 172, and 174 receives the multiplexed R-Y and B-Y base-band signals so a single filter may serve the purpose of more than one filter. Further, each chroma low pass filter 170, 172, and 174 has a respective flat frequency response up to a predetermined and decreasing cutoff frequency. In this manner, the bandwidth of the multiplexed R-Y and B-Y base-band signals is reduced a little bit more at the output of each filter. In the embodiment shown in FIG. 1, the chroma low pass filter 170 has a flat frequency response to a cutoff frequency of approximately 1.5 MHz. Exemplary frequency responses of the chroma low pass filters 172, 174, and 176 are shown and described with respect to FIGS. 19A-B.

The chroma low pass filter B 172 shown in FIG. 1 has a relatively lower cutoff frequency than the chroma low pass filter A 170. The cutoff frequency for the chroma low pass filter B 172 in the embodiment shown is approximately 1.2 MHz. A chroma edge enhancer 182 follows the chroma low pass filter B 172 to provide signal compensation for any reduced chroma bandwidth. The embodiment shown uses an enhancement signal derived from the luma edge to enhance the chroma. This enhancement signal can for instance be the absolute value of the high frequency part of the comb HP luma signal 144. This technique provides a sharper chroma edge. That is, using the luma edge to enhance the chroma also improves or otherwise corrects the timing of the chroma edge match which makes the chroma edge appear relatively sharper to a viewer. The chroma low pass filter B 172 may be selectively applied by the adaptive comb filter 140 when the control logic determined that there is a preset amount or otherwise sufficient error between line B 126 and the "second" frame delay line G 138.

Chroma low pass filter C 174 has a relatively lower cutoff frequency than either of the other chroma low pass filters 170 and 172. The cutoff frequency in the embodiment shown in FIG. 1 is approximately 600 kHz. Similar to the chroma edge enhancer 182, a chroma edge enhancer 184 follows chroma low pass filter C 174 to provide signal compensation for any reduced chroma bandwidth. The chroma low pass filter C 174 may be selectively applied by the adaptive comb filter 140 when the control logic determines there is motion between lines and/or frames, otherwise inhibiting the frame comb, and detecting a preset amount or sufficient error in line error detectors A and C, B and Alpha, and B and Gamma so that line comb action is not conclusive.

Following each chroma low pass filter 170, 172, and 174, a compensating delay can be installed to receive a chroma filtered signal 176, 178, 180 from the respective filter. In the embodiment shown, a compensating delay 186 receives the chroma filtered signal 176 from the chroma low pass filter A 170. The compensating delay 186 delays the chroma filtered signal 176 to create a time delayed signal 190 which is synchronized in time with signals 192 and 194 output from the chroma edge enhancers 182 and 184, respectively.

A cross-fade switch 188 follows chroma low pass filter A 170, or the compensating delay 186 if used as described above, as well as each of the chroma edge enhancers 182 and 184. The cross-fade switch 188 receives a chroma bandwidth select signal 198 from the comb filter 140 for controlling selection between signals 190, 192, and 194. The cross-fade switch 188 includes at least one multiplier and preferably has one multiplier for each chroma low pass filter 170, 172, and 174. Thus, in this example, three corresponding multipliers are used. Two multipliers are used if only two chroma low pass filters are used. Another alternative is to multiply the output signals 190, 192, and 194 and multiplex the coefficient input to drive a single multiplier. Yet another alternative is to use data selectors instead of multipliers; however, data selectors may introduce undesirable switching noise as each different filter is selected. The output of the cross-fade switch 188 is an R-Y/B-Y output signal 196.

Note that FIG. 1 is an exemplary application of the invention to process a video signal for a NTSC standard. One skilled in the art will recognize how to apply the invention to process a video signal for other suitable standards such as PAL.

Band-Split Filter Operation

Referring back to FIG. 1, the band-split filter 104 initially handles the composite video input signal 102. The composite video input signal 102 carries both the luma and the modulated chroma in the same spectrum. Specifically, the chroma (U, V or R-Y, and B-Y) is modulated by the subcarrier at approximately 3.579545 MHz for NTSC and approximately 4.43361875 MHz for PAL. Usually, the bandwidth of a composite signal for both standards is approximately 1.3 MHz, for studio or production-type quality, on both sides of the subcarrier. Note that NTSC-standard television transmitters limit the transmitted bandwidth to approximately 4.2 MHz because of a 6 MHz channel limitation which limits the upper sideband to approximately 0.6 MHz. In these instances, there is little or no chroma signal component in the lower frequencies below 1.5 MHz and the relatively higher frequency luma signal component (from 2.2 MHz to 6 MHz) is mixed with the full amplitude modulated chroma signal component. There is a transition of chroma level from slightly below 1.5 MHz to approximately 2.5 MHz. Mathematically, the signal components can be described as follows:

Composite=Low Pass *Y*+High Pass *Y*+*U**sin(*wt*)+ *V**cos(*wt*)

(*w*=2piFsubcarrier)

In the preferred embodiment shown in FIG. 1, the LP video signal 108 portion is separated from the HP video signal 106 portion using the band-split filter 104. The band-split filter 104 has a Gaussian shape to minimize ringing of the LP portion. Mathematically, the HP video signal 106 and LP video signal 108 can be described as follows:

LP=Low Pass Y

*HP*=High Pass *Y*+*U**sin(*wt*)+*V**cos(*wt*)

In this embodiment, two different filters are utilized by the band-split filter 104 since the subcarrier frequency is different for NTSC and PAL. An example of the impulse responses for the filter and respective standard are as follows:

NTSC: [1 0 0 0 0 0 −9 0 −9 −16 0 0 −25 0 81 0 −9 144 145 0 81 0 145 . . . ]/1024

PAL: [3 0 0 8 −27 0 −60 −72 −27 −200 108 −72 85 648 108 1088 990 648 1736 648 990 . . . ]/8192

Figure 2A:
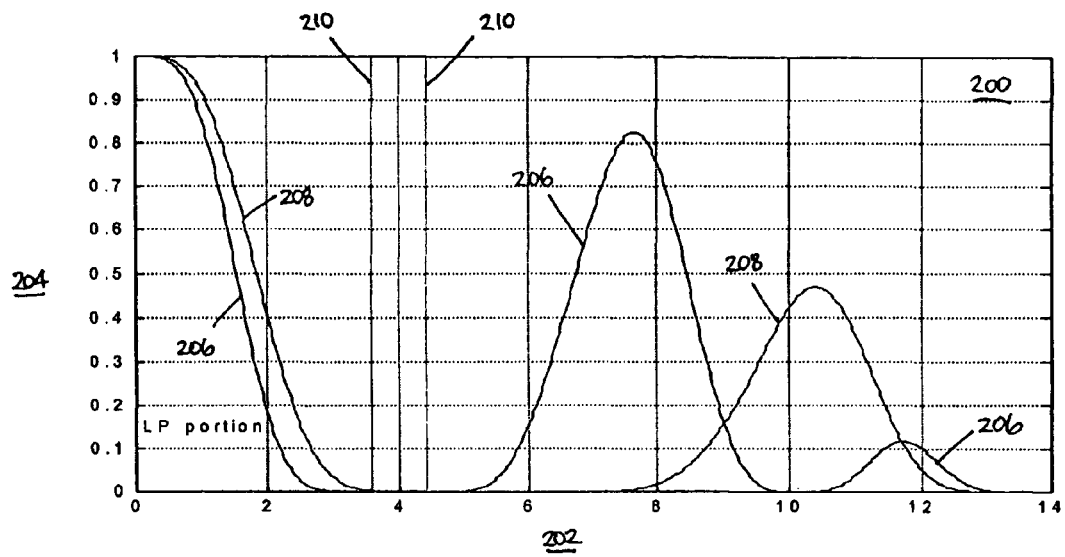
FIGS. 2A and 2B are a set of frequency response curves for a band-split filter for an embodiment of the system shown in FIG. 1.
Figure 2B:
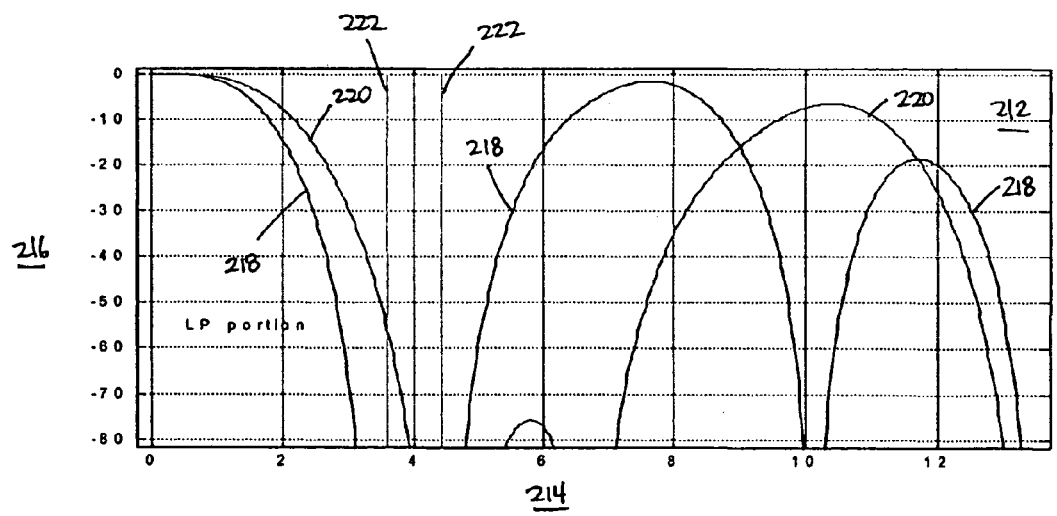

FIGS. 2A and 2B are a set of frequency response curves for the band-split filter 104 shown in FIG. 1. The frequency response curves of FIGS. 2A and 2B illustrate a range of operating characteristics for the band-split filter 104. In FIG. 2A, a graph 200 shows a signal frequency 202 versus amplitude 204 responses 206 and 208 of the band-split filter 104 for both an NTSC signal and a PAL signal, respectively. The scale for signal frequency 202 in this graph 200 ranges between approximately 0 and 14 MHz, while the amplitude 204 ranges between approximately 0 and 1 in magnitude. The subcarrier frequencies for each respective type of signal are shown at 210, as approximately 3.579545 MHz for NTSC and approximately 4.43361875 MHz for PAL.

Similarly, in FIG. 2B, a graph 212 shows the signal frequency 214 versus amplitude 216 responses 218 and 220 of the band-split filter 104 for both an NTSC signal and a PAL signal, respectively. The scale for signal frequency 214 in this graph 200 ranges between approximately 0 and 14 MHz, while the amplitude 216 ranges between approximately −80 and 0 in magnitude. The subcarrier frequencies for each respective type of signal are shown at 222 as approximately 3.579545 MHz for NTSC and approximately 4.43361875 MHz for PAL.

Comb Filter Operation

The adaptive comb filter 140 includes one or more adders or subtractors to extract the chroma from the luma signal, or to cancel the chroma in the luma signal. The art of a simple comb filter is well known and illustrated in U.S. Pat. No. 6,278,495 B1, the teachings of which have previously been incorporated herein by reference. In a composite NTSC video signal, the lines alternate in subcarrier phase. Therefore, when a given video line is subtracted from the line above, line below, last field or last frame, the luma is cancelled and the chroma is doubled if the lines contain the same luma information, chroma phase, and chroma amplitude. If these out-of-phase lines are added to the center line, the chroma is cancelled but only when the luma and chroma levels and phases match. Error detectors are used to determine how well the luma and chroma signals in the surrounding lines match the given line. These error signals are then used to determine which if any of the out-of-phase surrounding lines can be used to separate the luma and chroma cleanly. Subtracting a line that does not match does not completely cancel the luma in the chroma signal, or cancel the chroma in the luma signal. When none of the surrounding lines match well enough, HP luma trap 142 is selected by cross fade block 146 to filter out most of the chroma subcarrier in the HP luma signal. The design of the filter shown in FIG. 1 is a compromise that is designed to pass as much of the HP chroma signal as possible to maintain luma resolution while canceling most of the offending chroma subcarrier. When the notch is too broad, the luma is too soft, and when it is too sharp, it causes too much ringing and passes too many of the chroma sidebands that results in hanging dots. The error detection logic produces the luma trap select signal 149. In a first condition, the adaptive comb filter 140 finds a matching line and utilizes an associated notch filter that applies a comb-type logic to the composite input video signal 102 with at least one surrounding or adjacent out-of-phase line. The luma trap select causes the cross fade block 146 to select the combed HP luma signal 144 effectively bypassing the HP luma trap 142. This is known as "full combing" of the composite video input signal 102.

In a second condition, the comb filter 140 utilizes the error detection logic fails to find any correlation of the composite video input signal 102 with any surrounding or adjacent out-of-phase line. This condition is known as "comb failure." In the condition of comb failure, the luma trap select signal 144 causes the cross fade block 146 to select the uncombed HP portion of centerline signal that is passed through the HP luma trap 142.

Figure 3A:
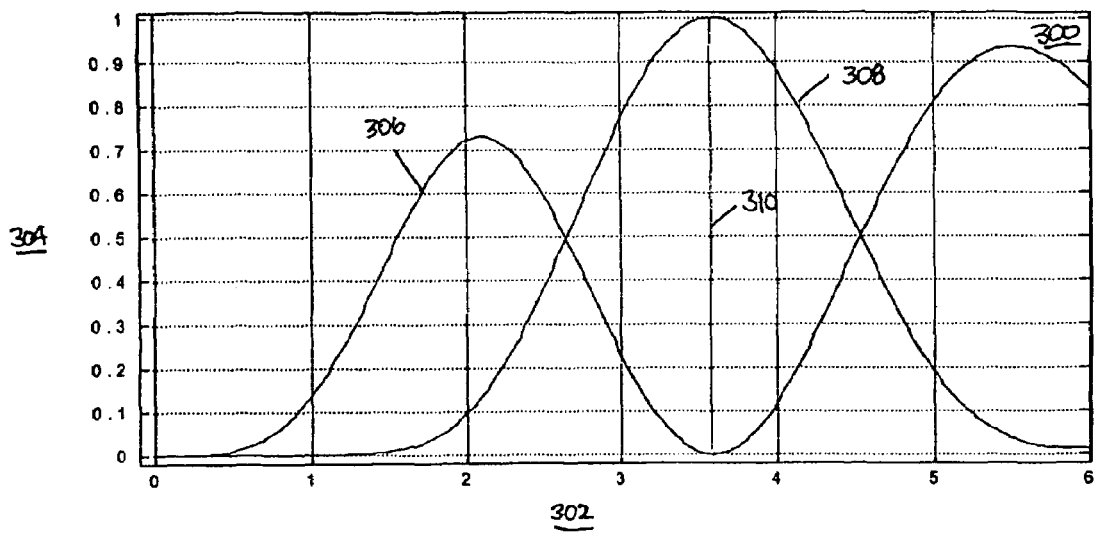
FIGS. 3A and 3B are a set of frequency response curves for a notch filter for an embodiment of the system shown in FIG. 1.

In FIG. 3A, a graph 300 shows the signal frequency 302 versus signal amplitude 304, and response 306 of the notch filter for an NTSC signal. The scale for signal frequency 302 in graph 300 ranges between approximately 0 and 6 MHz, while the signal amplitude 304 ranges between approximately 0 and 1 in magnitude. The response or transfer function 306 or "NotchB" corresponds to the high frequency luma component signal after processing by the band-split filter 104 and without the signal around the subcarrier frequency. The response or transfer function 308 or "ComplNotchB" corresponds to the mirror image of NotchB. As shown, subcarrier frequency 310 is approximately 3.579545 MHz for NTSC.

Figure 3B:
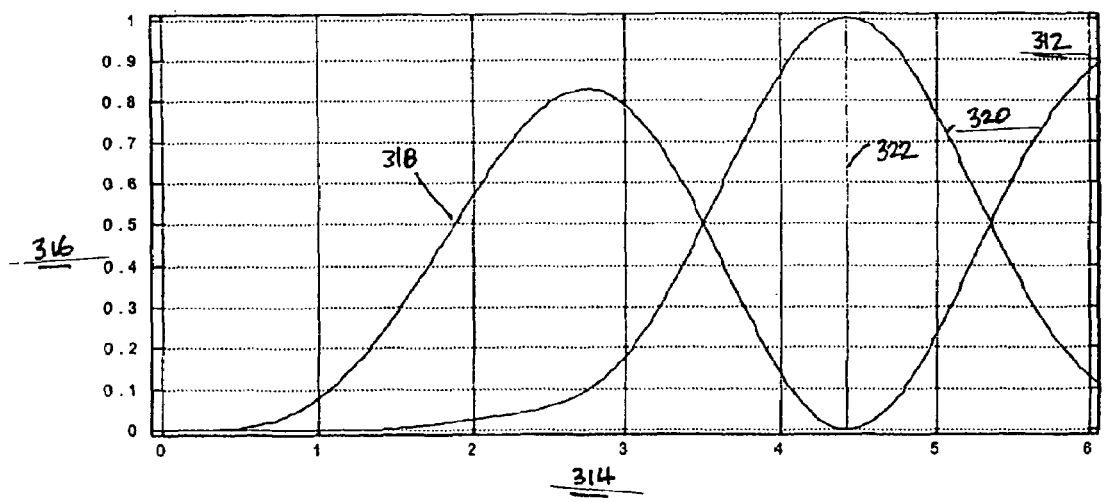

Similarly, in FIG. 3B, a graph 312 shows the signal frequency 314 versus signal amplitude 316 response 318 of the adaptive comb filter 140 for a PAL signal. The response or transfer function 318 or "NotchB" corresponds to the high frequency luma component signal after processing by the band-split filter 104 and without the signal around the subcarrier frequency. The response or transfer function 320 or "ComplNotchB" corresponds to the mirror image of NotchB. As shown, subcarrier frequency 322 is approximately 4.43361875 MHz for PAL.

Note that in FIGS. 3A and 3B, the responses 306, 308, 320, and 322 range between approximately 0 and 6 MHz since there is no signal above these frequencies. This effect is due to the signal being removed by the pre-processing half-band filter. An example of the impulse responses for each filter and respective signal standard are as follows:

Notch NTSC: [−4 0 20 0 28 0 −100 0 −48 0 224 0 28 0 722 0 28 . . . ]/1024

ComplNotch NTSC: [−4 0 20 0 28 0 −100 0 −48 0 224 0 28 0 302 0 28 . . . ]/1024

NotchNPAL: [−8 0 9 0 10 0 −40 0 32 0 32 0 180 0 32 . . . ]/256

ComplNotchPAL: [−8 0 9 0 100 −40 0 32 0 32 0 76 0 32 . . . ]/256

Line and Frame Delays—NTSC

NTSC comb operation can be characterized by the reversal of the subcarrier in every other line of the composite video input signal 102. If line B is the current line to be processed by the delay, the next line is line A (immediately below or adjacent to line B), the previous line is C (immediately above or adjacent to line B but opposed to line A), two (2) lines above line B is line Gamma, and two (2) lines below line B is line Alpha. The previous field line (approximately 263 lines before line B) is line D, and the line one frame ahead is line F. The line two (2) frames before the one containing line B is line H. Since lines A, C, D and F are out-of-phase with line B, these out-of-phase lines are used to comb the signal with line B. Lines Alpha, Gamma, and H are in-phase with line B, and these lines are generally used to generate at least one composite comparison. For instance, a composite comparison can be used for motion detection between lines.

FIG. 1 shows the current implementation for the band-split filter 104 and the different delays 114, 116, 118, and 120. In many instances, the delays 114, 116, 118, and 120 or memories are used to delay portions of the data stream output by the multiplexer 110 at approximately 54 MHz. A 54 MHz clock rate is preferable since the LP signal 108 and HP signal 106 of the data stream are each sampled by the delays 114, 116, 118, and 120 at approximately 27 MHz. Multiplexing the LP video signal 108 and HP video signal 106 reduces the need for multiple band-split filters.

Alternatively for ASIC-type applications, the composite video input signal 102 could be input to delays similar to 114, 116, 118, 120, 132 and 134, and then to corresponding band-split filters similar to band split filter 104 positioned adjacent to the outputs of delays for lines A, B, C and F. This particular embodiment would not require the band-pass filter 104 and multiplexer 110, and would utilize less memory bits but require corresponding band-split filters for each of the outputs of delays for lines A, B, C and F. Delay taps for lines Alpha, Gamma and H may use the composite video input signal 102 without HP and LP separation for comparisons since they are in phase with line B.

Line and Frame Delays—PAL

One skilled in the art will recognize the differences in implementing the invention for different types of signal standards. For example, implementing the comb filter system 100 for a signal in the PAL standard has different aspects to be addressed: (1) the subcarrier is shifted by almost 270 degrees every line instead of 180 degrees; (2) the V vector is inverted every line (PAL switch); and (3) there is a 25 Hz offset so the exact phase shift is approximately 270.576 degrees every line. The embodiment shown uses several techniques to handle these differences. First, the adaptive comb filter 140 shifts the high frequencies of the composite video input signal 102 to recover the approximately 25 Hz offset. Next, the adaptive comb filter 140 utilizes an associated PAL modifier to rotate both V and U such that these signal components are out-of-phase with the current line (case for line A with line C, and line F with line E (313 lines before B)).

However, line Alpha and line Gamma can be used almost directly to comb with line B, however, there is a small phase difference due to the 25 Hz offset. Line H (2 frames delayed) is also out-of-phase, and the 25 Hz offset is not present because the 25 Hz offset adds up to 360 degrees every 625 lines. Thus, Line H is the preferred line to comb with when there is no motion. Also, line D (312 lines before B) can be used directly because the 25 Hz offset adds up to 180 degrees. In summary for the PAL standard, the adaptive comb filter 140 can use lines designated as Alpha, Gamma, AC average and PAL modified, EF average and PAL modified, D, and H to comb with B.

Comb Filter Processing

Matrix Conversion

Figure 4:
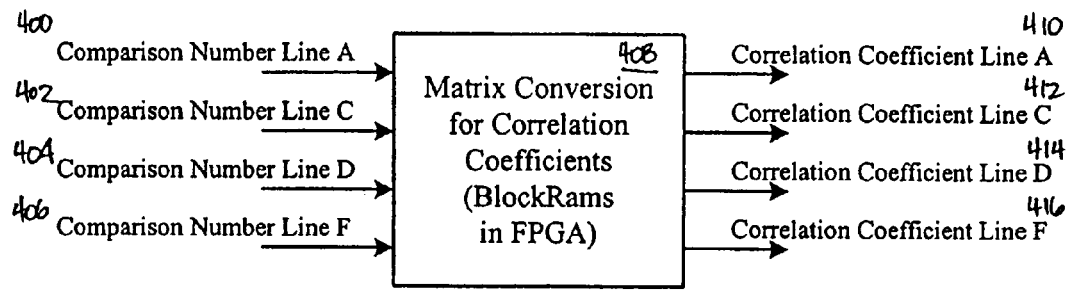
FIG. 4 is a functional block diagram of a matrix conversion for the series of line delays for an embodiment of the system shown in FIG. 1.

FIG. 4 is a functional block diagram of a matrix conversion for the series of line delays shown in FIG. 1. A typical luma/chroma signal component separation is performed by the adaptive comb filter 140 using up to four (4) out-of-phase lines around a selected line or signal such as the designated center line B. As shown in FIGS. 1 and 4, the adaptive comb filter 140 utilizes a combination of four lines 122, 124, 128, 130 rather than only one of the four lines to comb with the center line, such as line B 126. For a 3D-type comb filter, a fading process is implemented with at least one multiplier for each line. In any instance, the adaptive comb filter 140 can determine a coefficient from at least one of the comparisons with the center line B.

As shown in FIG. 4, a set of comparison numbers 400, 402, 404, and 406 is an input to functional block 408 representing the adaptive comb filter 140 which performs a matrix conversion for correlation coefficients. The adaptive comb filter 140 determines a correlation coefficient 410, 412, 414, and 416 for each respective input line 400, 402, 404, and 406. In this and in other embodiments, each correlation coefficient can be modified by additional system components or methods described in FIGS. 5-19. For instance, a method associated with detecting motion or an instance in which luma only exists in a video line can be used to modify the correlation coefficients.

In any instance, the comparison numbers 400, 402, 404, and 406 can be the difference between a center line, such as line B, and each of the combable lines which can be expressed between 0 and 7 using 3 bits. For example, 0 means that there is no difference with line B, and 7 means that there is no match with line B. Next, the comparison numbers 400, 402, 404, and 406 are input to a matrix conversion, block 408, which is preferably implemented in a dual port memory made from BlockRams components within a Xilinx-brand FPGA, which determines a weighting for each respective line. The outputs are a set of corresponding correlation coefficients 410, 412, 414, and 416 expressed using 4 bits between 0 and 8. For example, 0 means that the line will not be used in the adaptive comb filter and 8 means that the line will be fully used in the comb filter. The sum of the correlation coefficients used in this example will be between 0 and 8. If the sum equals 0, the matrix at block 408 failed to find any line to comb with; and if the sum equals 8, the adaptive comb filter 140 will fully comb the composite video input signal 102 with one or several lines. Note that the example shown in FIG. 4 utilizes lines A, C, D and F for processing a NTSC standard signal. In some instances, an adaptive comb filter for a NTSC standard signal may not use line D, resulting in a corresponding comparison number in line D having a value of 7.

Alternatively, lines A, C, (A+C)/2 or F could be used for a NTSC standard signal. In the instance of a PAL standard signal, designated lines can be Alpha, Gamma, AC average and H (it used to be AC average, D and EF average). One skilled in the art will recognize how to implement the systems and methods disclosed herein for other standards such as PAL.

While in the preferred embodiment the system 100 has the matrix at block 408 for receiving the combination of four lines 122, 124, 128, 130, the system 100 according to other embodiments of the invention may use fewer or additional lines in the control logic within the comb filter 140.

3D Comb Filter Equations (with A, C, D and F)

In the embodiment shown, the adaptive comb filter 140 is a 3D-type comb filter. The comparison numbers 400, 402, 404, and 406 correspond to the following lines: one line below (Line A) a center line or selected video line; one line above (Line C) a center line or selected video line; the line one field before (Line D) a center line or selected video line; and the line one frame before (Line F) a center line or selected video line. All of these lines are encoded with inverted chrominance modulation to compare to the current line (Line B), also known as the center line or selected video line. For example, the lines can be mathematically represented as follows:

Composite input $B = YB + UB^*\cos(wt+p) + VB^*\sin(wt+p)$

Composite input $X = YX - UX^*\cos(wt+p) - VX^*\sin(wt+p)$

Also, the band-split filter 104 separates low (LP) and high (HP) frequencies of the composite video input signal 102. The LP video signal 108 has no modulated chrominance and the HP video signal 106 has all the modulated chrominance (C) and the high frequency luminance (HL). These signal portions can be represented as follows:

Composite input $B = LPB + HPB = LPB + (HLB + CB)$

Composite input $X = LPX + HPX = LPX + (HLX - CX)$

Also, the HP B signal 106 is filtered by a "notch filter" (stop band) around the subcarrier frequency which is approximately 3.5795 MHz for NTSC and approximately 4.4336 MHz for PAL to obtain the enhanced luminance (NHB) used when the comb filter fails. A complementary output filter (band pass filter) is used as the enhanced chrominance (CNHB): so HPB=NHB+CNHB The adaptive comb filter 140 utilizes 4 bit coefficients AX, CX, DX and FX which define the correlation between the center line, such as Line B, and the other out-of-phase lines. The coefficients and signal components can be represented as follows:

$\Sigma Xi = (AX+CX+DX+FX)$, $\Sigma Xi <= 1$ (with $AX[3:0] = 4'b1000 = 1$)

($\Sigma Xi = 0$)⇔"comb failure" and ($\Sigma Xi = 1$)⇔"full comb"

$LUMA = LPB + (\Sigma Xi^* HPXi)/2 + (\Sigma Xi)^* HPB/2 + (1-\Sigma Xi)^* NHB$ $CHROMA = (\Sigma Xi)^* HPB/2 - (\Sigma Xi^* HPXi)/2 + (1-\Sigma Xi)^* CNHB$ Note: if $\Sigma Xi <= 0.25$, then CHROMA=HPB/2−HPA/4−HPC/4

LP/HP Comparisons Between Line B and Out-of-Phase Lines

Figure 5:
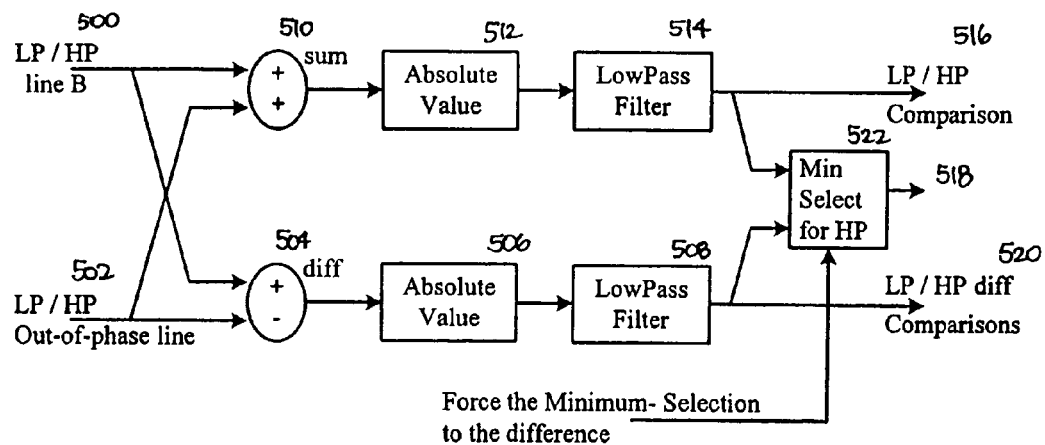
FIG. 5 is a signal flow diagram for an embodiment of the comb filter system shown in FIG. 1.
Figure 6:
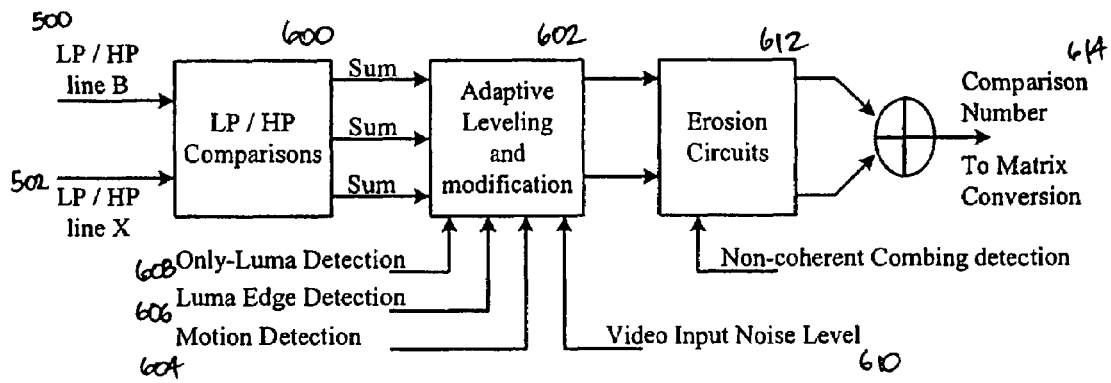
FIG. 6 is another signal flow diagram for an embodiment of the comb filter system shown in FIG. 1.

FIGS. 5 and 6 are signal flow diagrams for the comb filter system 100 shown in FIG. 1. FIG. 5 illustrates identifying video lines with an out-of-phase subcarrier, and then determining if these video lines are similar to a selected line. From these particular video lines, the luma and chroma signal components can be separated. FIG. 6 illustrates how line comparisons are modified by the adaptive comb filter 140.

As shown in FIGS. 5 and 6, a comparison of each LP/HP signal line 500 with the LP B/HP B signal line 502, or a center line, is performed. For instance, lines A, C and F can be compared to a center line signal, such as line B, for a NTSC standard signal; and lines Alpha, AC, Gamma, D, EF, and H, can be compared to a center line signal for a PAL standard signal. Typically, the LP/HP signal line 502 is an out-of-phase line. Since the LP signal carries only luma information, the comparison at blocks 504 and 506 in FIG. 5 determines the absolute value of the difference. The result is then filtered at a low pass filter 508 to eliminate small errors. Conversely, since the HP signal can carry both chroma and high frequency luma, two comparisons can be made. First, the comparison at blocks 504 and 506 determines the absolute value of the difference in the instance when there is no chroma. Second, the comparison at blocks 510 and 512 determines the absolute value of the sum in the instance when there is only out-of-phase chroma. Both comparisons are filtered at respective low pass filters 508 and 514. Note that for these particular filtering operations, the high frequency signals are demodulated from the absolute value function. An example of a low pass filter impulse response is: [1 2 3 4 3 2 1]/16

Three resultant signals 516, 518, and 520 are then adaptively leveled and modified at block 602 in FIG. 6, depending on at least one other factor, such as motion detection 604, luma edge detection 606, composite in-phase line comparisons or luma-only detection 608, or video input noise level 610. For instance, the resultant signals 516, 518, and 520 can be adaptively modified based upon detection of a line with only a luma component. Typically at block 522 in FIG. 5, a minimum between the sum and the difference of the HP comparison is determined. However, if a particular line only contains a luma signal component, the sum is discarded. Another example is adjusting the resultant signals depending on video input noise level. Initially, any noise on the composite video input signal 102 is measured. The comparison of all of the signals can then be modified accordingly at block 602 to be less sensitive to any detected noise. In any instance, if the noise is relatively high, a greater number of lines should be combed even if a match with the center line, such as line B, is not made since the noise will be decreased at the output of the comb filter 140 for the combed HP luma 144 and at the output of the demodulator 168 for chroma.

Finally, the LP and HP comparisons 516, 518, 520 go into associated erosion circuits 612. The comparisons are then summed together at block 614 before going into a matrix conversion as comparison numbers, shown and described in FIG. 4.

Luma Edge Detection

Figure 7:
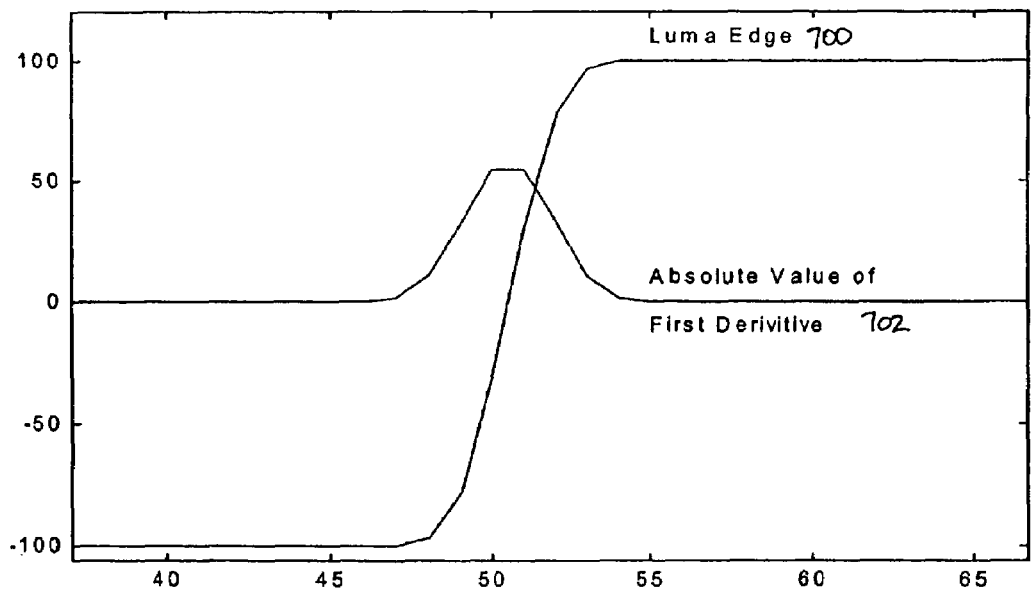
FIG. 7 is a graphical view of luma edge detection for an embodiment of the comb filter system shown in FIG. 1.
Figure 8:
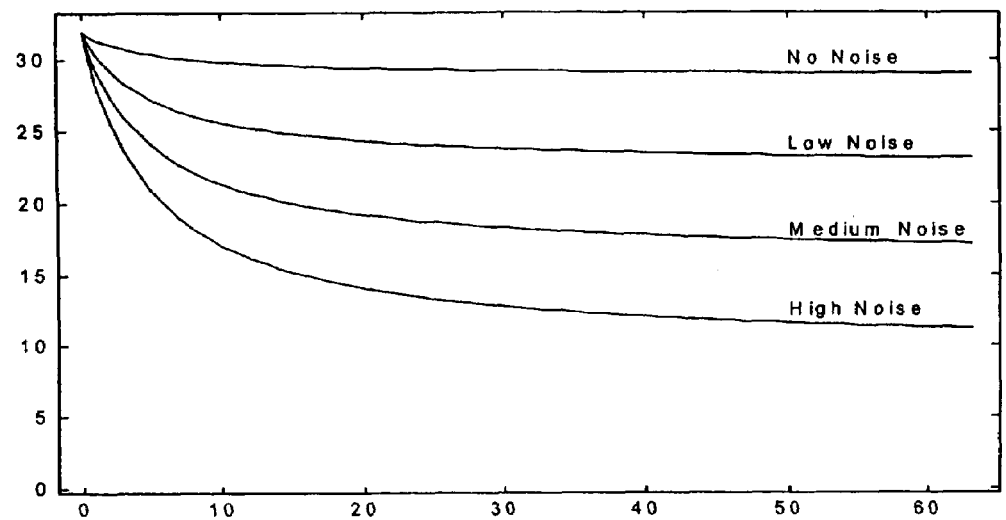
FIG. 8 is a set of frequency response curves illustrating measurement of various amounts of video input noise for an embodiment of the comb filter system shown in FIG. 1.

FIG. 7 is a graphical view of a method for detecting a luma edge performed by the comb filter 140 shown in FIG. 1 and FIG. 8 is a set of video input noise measurements for a composite video input signal 102. Typically in the instance when there are vertical edges on an image for a device 160 such as a display device, there is some high frequency luma with chroma, it is sometimes difficult to compare the current line with the line above, below or one frame before. This difficulty is due to the high frequency luma being in phase and the modulated chroma (in the high frequency spectrum) being out-of-phase. To overcome this problem, the adaptive comb filter 140 detects a luma edge 700 in FIG. 7 using a low pass portion of the composite video input signal 102. This detection can be implemented by calculating the absolute value of the first derivative, shown by line 702, of the low pass portion of the composite video input signal 102.

The identified portion of the signal can then be used to adaptively modify the comparisons between the current line, such as line B, and the other lines being combed with other lines, such as lines A, C, D, F, etc. Furthermore, the absolute value of the first derivative, shown by line 702, can be dynamically changed depending on a video input noise measurement as shown in FIG. 8, for example by using an associated ROM or a dual port memory made from Block-Ram components in a Xilinx-brand FPGA.

Figure 9:
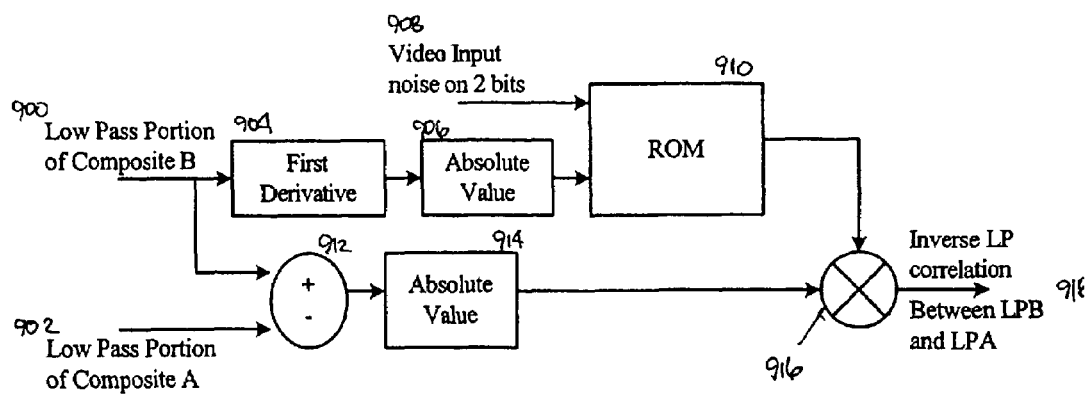
FIG. 9 is another signal flow diagram for an embodiment of the comb filter system shown in FIG. 1.

FIG. 9 is another signal flow diagram for the comb filter system 100 shown in FIG. 1. The signal flow path in FIG. 9 illustrates the signal processing described with respect to FIGS. 7 and 8. In this example, a LP portion of composite line B 900 and a LP portion of composite line A 902 are processed in the instance of a luma edge condition. At block 904, a first derivative is determined for the LP portion of composite line B 900. Next, at block 906, an absolute value of the first derivative can be expressed. In this example, the expression uses 6 bits between 0 and 63. At block 908, a measurement of video input noise can be expressed. In this example, the expression used 2 bits with 00=No noise, 01=Low Noise, 10=Medium Noise and 11=High Noise. The 8 bits can then be stored by a ROM 910. Similarly, the LP portion of composite line B 900 and a LP portion of composite line A 902 are compared at block 912. At block 914, an absolute value of the difference is expressed. The difference from block 914 and the values from ROM 910 are processed at block 916. An output signal 918 from block 916 can be then expressed on 4 bits for subsequent comparisons and modifications, such as adaptively modifying the comparisons between a center line, such as line B, and the other lines.

Thus for a luma edge in this example, the absolute value of the first derivative could be approximately 56. Assuming that the video input noise is 01 for Low Noise, then the output of the ROM 910 would be approximately 23. A comparison between the center line, such as line B, and the other lines would be reduced by a factor of approximately 23/32, thus reducing the sensitivity of the adaptive comb filter 140 in the instance of a luma edge.

The mathematical representation of FIG. 8 is as follows:

(Matlab Code for the Plot Below)

e=0:63;

plot(e,(((1./(e+5)*5*8)−8)*0.1+8)*4,e,(((1./(e+5)*5*8)−8)*0.3+8)*4,e,(((1./(e+5)*5*8)−8)*0.5+8)*4,e,(((1./(e+5)*5*8)−8)*0.7+8)*4);

text(50,30,'No Noise'); text(50,24,'Low Noise');

text(50,18,'Medium Noise'); text(50,12.5,'High Noise');

Composite Comparison Between In-Phase Lines

Figure 10:
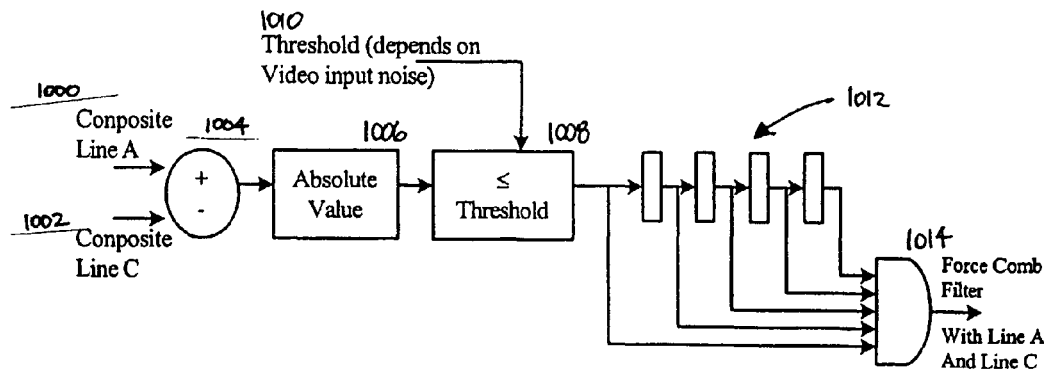
FIG. 10 is another signal flow diagram for an embodiment of the comb filter system shown in FIG. 1.

FIG. 10 is another signal flow diagram for the comb filter system 100 shown in FIG. 1. In some instances, when the current line (line B) and another line X (for instance line A or line C) are combed, there will be a conflict between the luma (same sign) and the chroma (inverse sign) in the high frequency range. This conflict is due to the subcarrier phase which is inverted every line for NTSC and every 2 lines for PAL. Mathematically, these signals can be expressed as:

Composite $B=LPYB+HPYB+$Modulated Chroma $B$

Composite $X=LPYX+HPYX-$Modulated Chroma $X$

As described previously, an aspect of the invention detects luma edges or high frequency luma and uses this signal to reduce the sensitivity of the comb error detection to pass edges that contain both high frequency luma and chroma. However, if the chroma is too saturated or if the luma edge is not sharp enough, the sensitivity of the comb error detection may not be sufficiently reduced. Furthermore, desensitizing the error detection may mask instances when the adaptive comb filter should not comb with the given line X. Another manner to handle this instance, in some instances simultaneously with luma edge detection or instead of luma detection, is to directly compare the composite signals of in-phase lines.

For instance, line A and line C for NTSC have the same subcarrier phase. These composite signals can be expressed mathematically as follows:

Composite $A = LPYA + HPYA +$ Modulated Chroma $A$

Composite $C = LPYC + HPYC +$ Modulated Chroma $C$

If the direct comparison of line A (line below line B) and line C (line above line B) is relatively small, the adaptive comb filter 140 combs with both line A and line C. An example is shown in FIG. 10. Composite line A 1000 and composite line C 1002 are input to block 1004. Next at block 1006, an absolute value of the difference between Composite line A 1000 and Composite line C 1002 is determined. Next, at block 1008, a comparison of the absolute value from block 1006 is made with a predetermined threshold. In some instances, the predetermined threshold can be modified or otherwise varied with the video input noise as shown with threshold adjustment signal 1010. If the predetermined threshold is not exceeded by the absolute value, then a flag can be set to a value such as 1; otherwise, the flag is set to a null value such as 0. If the value of the flag is set relatively high for a predetermined number of clocks or cycles 1012; then at block 1014, line A and line C can be forced to the comb filter 140.

A similar comparison process to that described in FIG. 10 can be performed between other lines such as between line A and line F, or between line C and line F, or between line C and line D, etc. For a PAL standard signal, the comparison could be between line Alpha and line Gamma. In general, the comparison process can be applied between any lines surrounding a selected line or center lines such as current line B, so the comparison could be performed between line F and line Fadv which is one frame after the current line B.

Motion Detection using Composite Signals—NTSC

Figure 11:
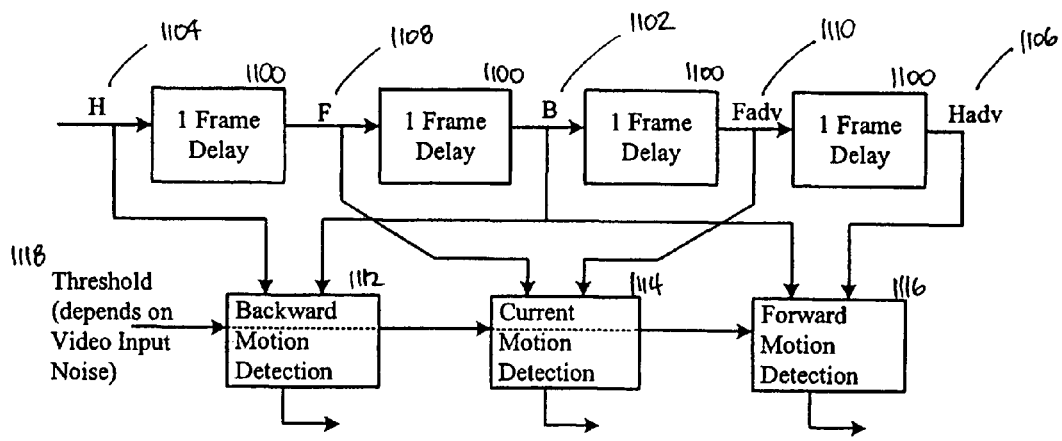
FIG. 11 is another signal flow diagram for an embodiment of the comb filter system shown in FIG. 1.

FIG. 11 is another signal flow diagram for the comb filter system 100 shown in FIG. 1. Similar to the comparison process described above in FIG. 10, motion detection can be implemented within the comb filter 140 with video lines in adjacent or nearby video frames. Using a series of frame delays 1100 or memories, similar to the frame delays 132 and 134 in FIG. 1, a selected line or center line 1102 can be compared with video lines 1104, 1106, 1108, and 1110 in adjacent or surrounding video frames. Results of the comparisons are determined at blocks 1112, 1114, and 1116 depending upon the combination of lines being compared. For example, in the instance of a NTSC standard signal, line B 1102 can be compared with the same line two frames before line H 1104 and/or two frames after line Hadv 1106. These respective comparison processes are also referred to as "backward motion detection" and "forward motion detection."

A comparison can be performed between any video line with the same subcarrier phase and that is adjacent or otherwise surrounding the selected line or center line such as current line B. For instance, the comparison process can be performed between the selected line or center line such as current line B and line F 1108 and/or line Fadv 1110. In any instance, a particular line or set of lines is compared to a selected line or center line such as line B 1102. Ultimately, the comparison results from any of blocks 1112, 1114, and/or 1116 are compared to a predetermined threshold 1118. Depending upon whether a predetermined threshold 1118 is exceeded by results from any of blocks 1112, 1114, and/or 1116, then subsequent filtering or other processing by the adaptive comb filter 140 can be applied or otherwise switched off as necessary. Note that as described above, the predetermined threshold 1118 can be modified or otherwise adjusted depending upon the magnitude of any previously measured video input noise.

In the instance of backward motion detection, the results of comparing line B 1102 with line F 1108 or another line in a previous frame such as line D can be used to disable subsequent filtering or other processing by the adaptive comb filter 140. Likewise, in the instance of forward motion detection, the results of comparing line B 1102 with line Fadv1 1110 or another line in an advanced frame such as line Dadv1 can be used to disable subsequent filtering or other processing by the adaptive comb filter 140. In any instance, any combination of forward and/or backward motion detection can be used together or separately to increase the sensitivity or accuracy of motion detection when resources such as memory or data storage are otherwise available.

Motion Detection Using the Low Pass Portion of Composite Signals—PAL

Figure 12:
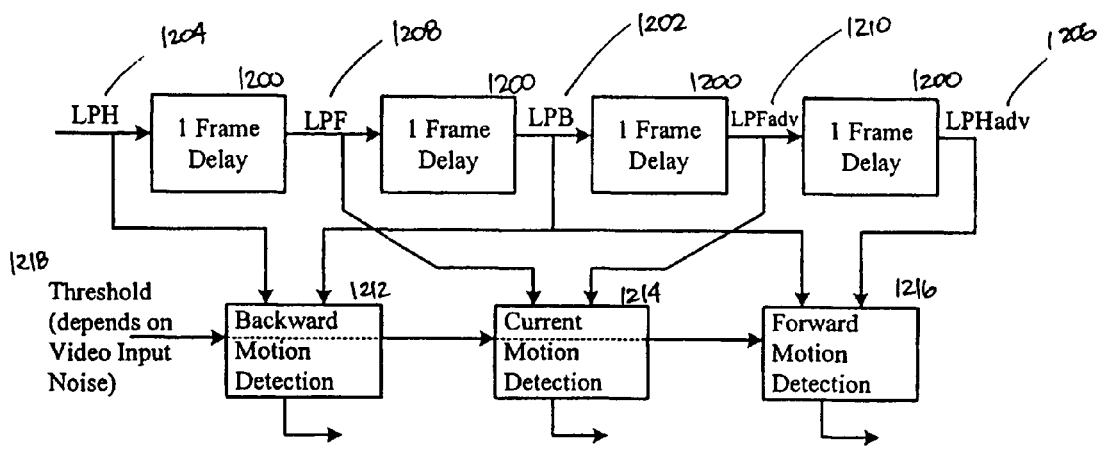
FIG. 12 is another signal flow diagram for an embodiment of the comb filter system shown in FIG. 1.

FIG. 12 is another signal flow diagram for the comb filter system 100 shown in FIG. 1. As one skilled in the art will recognize, there are differences in the video fields used by the various signal standards such as NTSC and PAL. For instance, a PAL standard signal includes an 8-field sequence instead of 4-field for a NTSC standard signal, and a particular standard may not support storing at least four frames of memory. In these instances, the comparison can be performed using a low pass portion of the composite signal.

Implementation of the process described in FIG. 11 can be applied to the low pass portion of the composite video input signal 102 as shown in FIG. 12. Using a series of frame delays 1200 or memories, similar to the frame delays 132 and 134 in FIG. 1, a selected line or center line 1202 can be compared with video lines 1204, 1206, 1208, and 1210 in adjacent or surrounding video frames. Results of the comparisons are determined at blocks 1212, 1214, and 1216, depending upon the combination of lines being compared. A comparison can be performed between any video line that is adjacent or otherwise surrounding the selected line or center line such as current line B. In any instance, a particular line or set of lines is compared to a selected line or center line such as line LPB 1202. Ultimately, the comparison results from any of blocks 1212, 1214, and/or 1216 are compared to a predetermined threshold 1218. Depending upon whether a predetermined threshold 1218 is exceeded by results from any of blocks 1212, 1214, and/or 1216, then subsequent filtering or other processing by the adaptive comb filter 140 can be applied or otherwise switched off as necessary. Note that as described above, the predetermined threshold 1218 can be modified or otherwise adjusted depending upon the magnitude of any previously measured video input noise.

Although comparison results may be relatively less accurate than a comparison of the entire composite video input signal 102; since luma and chroma are often correlated, the results can be acceptable. For instance, if there is a transition of luma, it is likely that there is a corresponding transition of chroma. In this instance, the comparison results using a low pass portion of the composite signal would be acceptable.

Gradual Motion Detection

Figure 13:
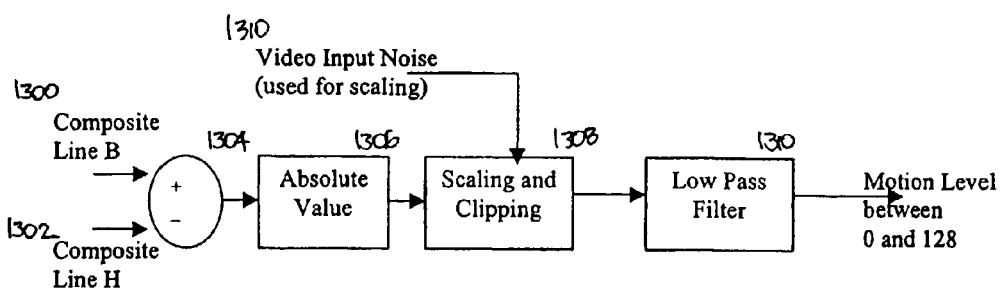
FIG. 13 is another signal flow diagram for an embodiment of the comb filter system shown in FIG. 1.

FIG. 13 is another signal flow diagram for the comb filter system 100 shown in FIG. 1. Instead of having to code a signal as "full motion" or "no motion," in many instances, a signal that gradually increases with the magnitude of detected motion is desirable. In this manner, other circuits that depend on or otherwise are sensitive to motion can vary the signal in a relatively smooth fashion; thus, resulting in an improved video signal with an enhanced viewing quality. For instance, if the bandwidth of the decoded signals (luma or demodulated chroma) is reduced when there is motion, there is an improvement in the viewing quality of the video signal when the signal is adjusted or otherwise modified to gradually fade between the two extremes of "full motion" and "no motion." In these instances, a viewer's eye is more sensitive to the resultant sharpness of the video signal on a video display but the occurrence of video artifacts is reduced.

As shown in FIG. 13, a selected line or center line such as composite line B 1300 or line F and Composite Line H 1302 or line Fadv are compared at block 1304. Next at block 1306, an absolute value of the comparison from block 1304 is determined. It is sometimes useful to dynamically change the motion detection or motion measurement depending on at least one other parameter, such as the magnitude of any measured video input noise. This change is implemented at block 1308 by either scaling up or down the absolute value of the comparison from block 1306 between a selected line or center line such as composite line B 1300 and Composite Line F 1302. Note that at 1310, the scaling of block 1308 can be adjusted or otherwise modified depending upon the magnitude of any measured video input noise. For instance, if the magnitude of any measured video input noise is "01", then the absolute value is divided by two. If the magnitude of any measured video input noise is "10," then the absolute value is divided by four. The resulting signal from block 1308 can then be processed by a low pass filter at block 1310.

Conversely, it may be necessary to limit the motion measurement of the composite video input signal 102. Limiting the motion measurement can be done using a clipper at block 1308 so that the motion is only expressed in a predefined range. For instance, motion can be expressed on 8 bits between 0 and 128 with 0=no motion and 128=full motion. Since the absolute value sometimes creates harmonics in the high frequency spectrum, it is sometimes useful to filter some of the motion measurement. In order to minimize undershoots and overshoots, the low pass filter applied at block 1310 should be with positive-only coefficients.

As an example, the impulse response of the low pass filter at 1310 can be:

[1/8 1/4 1/4 1/4 1/8].

The process described with respect to FIG. 13 can also be applied to the other comparisons between composite and/or low pass portions of other video lines. For example, a comparison between composite line F and composite line Fadv1, or between composite line B and composite line Hadv, or between the low pass portion of line B (LPB) and low pass portion of line F (LPF), etc.

Luma-Only Detection

Figure 14:
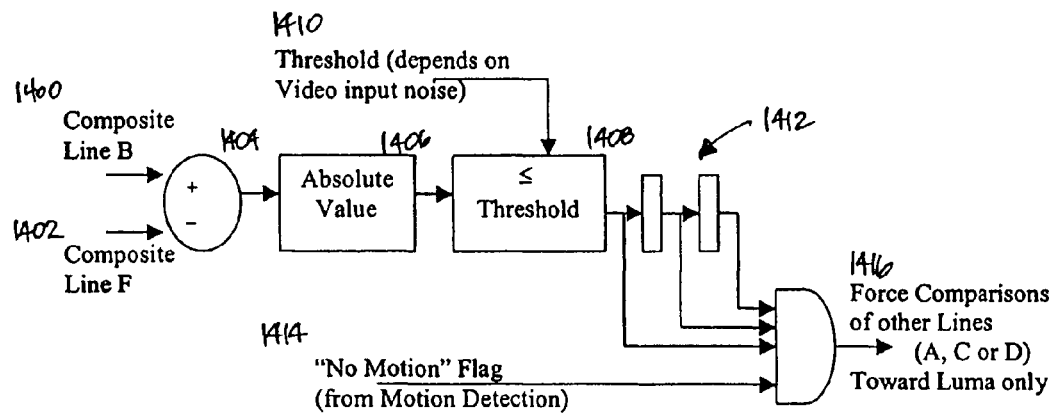
FIG. 14 is another signal flow diagram for an embodiment of the comb filter system shown in FIG. 1.

FIG. 14 is another signal flow diagram for the comb filter system 100 shown in FIG. 1. As previously described in some instances, a difficulty occurs in measuring the correlation between the selected line or center line such as current line B and the surrounding out-of-phase lines A, C, D or F due to the absence of high frequency luma and modulated inverted chroma. However, if the video image does not have any color in some portion of the image, then the problem should not appear when these instances are detected by the comb filter system 100.

Another aspect of the invention includes detecting that a selected line or center line or current line has no color when there is no motion. This instance is also known as "Luma-Only Detection" (the terms luma-only and luminance combing are used interchangeably herein). By comparing the composite current line with the composite line one frame before the current line, the system 100 can detect that the current line has no color, otherwise the out-of-phase color would add up in the comparison. Furthermore, the motion detection can be dependent on the magnitude of any measured video input noise, resulting in relatively less sensitivity during the comparison if video input noise exists.

This process can be used for the comparison between the selected line or center line such as current line B and the line above and below the selected line or center line such as line A and line C. In this instance, a comparison is made of the difference between the HP portions of the lines, and the sum between the HP portions of the lines is disabled. This process narrows the comparison and improves the relative accuracy of the comparison.

As shown in FIG. 14, composite line B 1400 and out-of-phase composite line F 1402 are compared at block 1404. Next at block 1406, an absolute value of the comparison value is determined. In block 1408, the absolute value is compared to a predetermined threshold 1410. As described above, the predetermined threshold 1410 can be adjusted or otherwise modified depending upon the magnitude of the measurement of any video input noise. If the predetermined threshold is not exceeded as determined at block 1408, then a flag can be set to a value such as 1; otherwise, the flag is set to a null value such as 0. If the value of the flag is high for a predetermined number of clocks or cycles 1412 and a "no motion flag" is high; then block 1416 determines that there is "no motion" and also is "luma only" detection. Block 1416 forces a comparison of other lines line A and line C to the comb filter 140.

Non-Coherent Combing Detection

Figure 15:
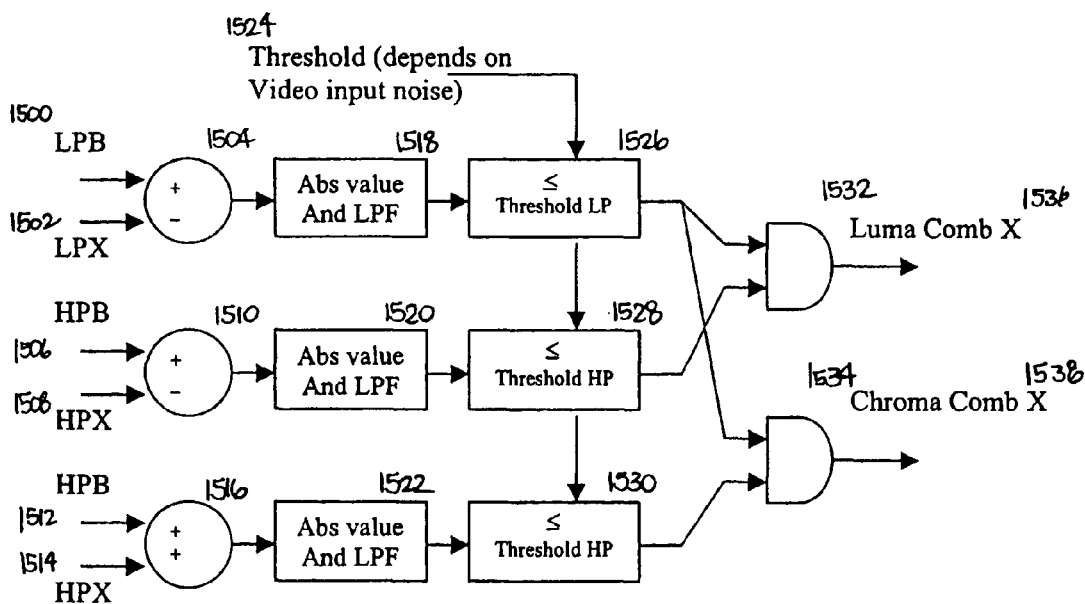
FIG. 15 is a another signal flow diagram for an embodiment of the comb filter system shown in FIG. 1.

FIG. 15 is a another signal flow diagram for the comb filter system 100 shown in FIG. 1. Each of the previously described comparisons between the current line B and the other surrounding lines, such as lines A, C, D, F, etc., is independent of the other comparisons. As previously described in FIG. 14, motion detection or the comparison between composite line A and composite line C is accounted for; but assuming that there is motion and that composite line A and composite line C (or F and A or F and C . . . ) do not match, then the correlation coefficients are calculated independently by comparing the difference of the LP signals and comparing the minimum between the sum and the difference of the HP signals.

Another aspect of the invention determines the non-coherent decisions made by the comb filter matrix 408 of the adaptive comb filter 140. For instance, if the minimum between the sum and the difference of the HP signals between composite line B and composite line A is the sum, and if the minimum between the sum and the difference of the HP signals between composite line B and composite line C is the difference, then the adaptive comb filter 140 may permit full combing with both line A and line C. However, one of these instances may be incorrect. Given a color and a luma level for composite line B, if both composite line A and C claim a match with composite line B, then a match is determined for the same reason; otherwise, there is an incoherence between the matches.

As described above, for any surrounding out-of-phase line X (lines A, C, D, F, etc.), at least two signals are created to determine which direction the comb filter 140 will be applied. Shown in FIG. 15, the LPB 1500 and LPX signals 1502 are processed at block 1504. Similarly, the HPB 1506 and HPX signals 1508 are processed at block 1510, as the HPB 1512 and HPX 1514 signals are processed at block 1516. After the absolute values and low pass signal portions of the results are determined at blocks 1518, 1520, and 1522 respectively, a LP comparison with a predetermined threshold 1524 for each respective result can be made at blocks 1526, 1528, and 1530. The LP comparison can be used in both instances at blocks 1532 and 1534 since the system 100 often relies on this comparison. For example, if "Luma Comb X" 1536=0 and "Chroma Comb X" 1538=0, the comb filter matrix 408 of the adaptive comb filter 140 cannot decide to comb with line X. If "Luma Comb X" 1536=0 and "Chroma Comb X" 1538=1, the comb filter matrix 408 of the adaptive comb filter 140 will likely decide to comb with line X because of similar chroma between line B and line X. If "Luma Comb X" 1536=1 and "Chroma Comb X" 1538=0, the comb filter matrix 408 of the adaptive comb filter 140 will likely decide to comb with line X because of similar luma between line B and line X. If "Luma Comb X" 1536=1 and "Chroma Comb X" 1538=1, the comb filter matrix 408 of the adaptive comb filter 140 will likely decide to comb with line X because there is no high frequency luma and no high chroma.

Figure 16:
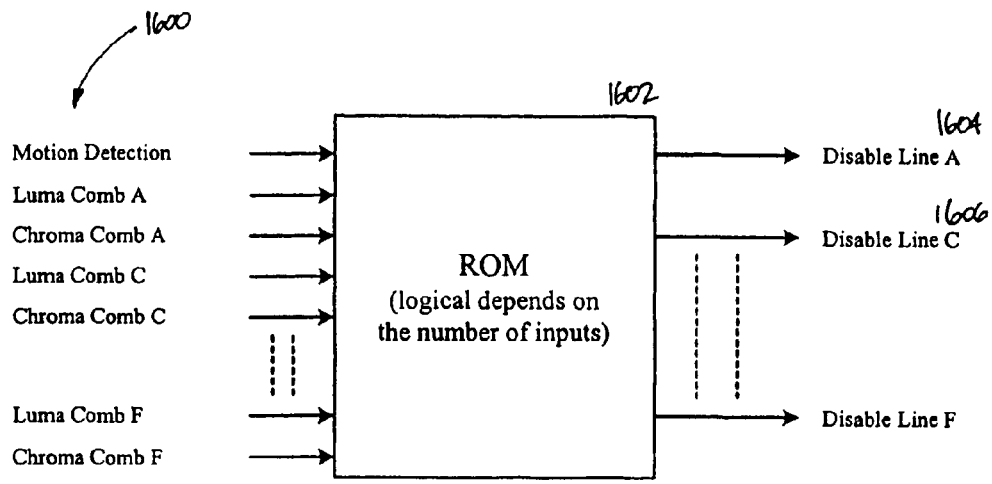
FIG. 16 is a functional block diagram for an embodiment of the comb filter system shown in FIG. 1.

FIG. 16 is a functional block diagram of a portion of an adaptive comb filter 140 shown in FIG. 1 The aspect of the invention described in FIG. 15 can also be applied to 3D comb filter with a plurality of surrounding lines such as 4 or 5 surrounding lines, such that detection of non-coherent combing is applied between all of these lines. A status or state of each line 1600 can be coded, and then all of the information is regrouped or otherwise collected or stored in a ROM 1602. The adaptive comb filter 140 then decides to disable any non-coherent lines before they are actually applied by the adaptive comb filter 140. Other signals which can be regrouped or otherwise collected or stored in a ROM 1602 are those associated with motion detection or the comparison between composite line A and composite line C.

For instance, if no motion is detected, and line A is combing toward luma but line F and line C are combing toward chroma, line A can be disabled 1604. Alternatively, if there is motion with line F not combing at all, and line A is combing toward chroma but line C is combing toward luma, then line C 1606 can be disabled since the composite video input signal 102 is relatively more likely to have color.

As the number of inputs increases to the ROM 1602, the function becomes more relatively complicated. In an alternative embodiment, a dual port memory made from Block-RAM components within a Xilinx-brand FPGA can be used since user adjustments can be made to permit minimization of any comb artifacts. Furthermore, such a memory storage device or similar device can also include several settings that the user can select depending on the application or use of the system 100.

Erosion Circuit After the Line Comparisons

Figure 17:
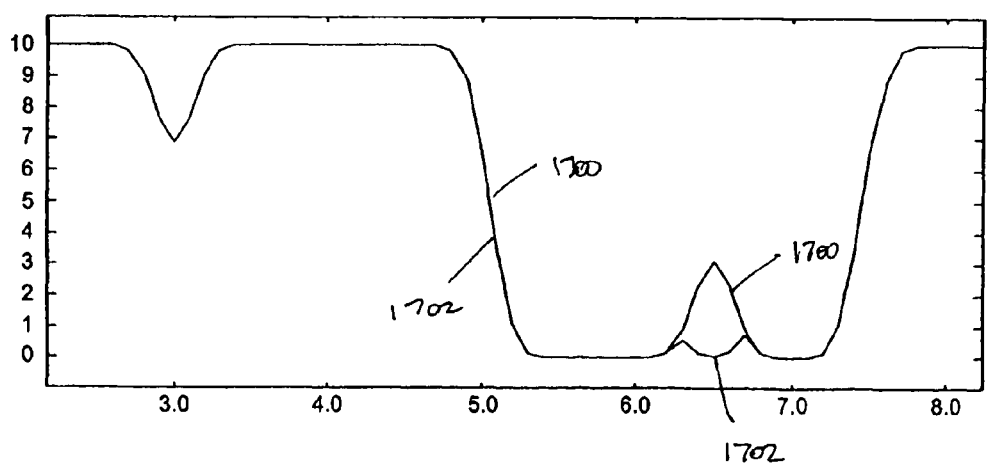
FIG. 17 is a frequency response curve for an embodiment of the comb filter shown in FIG. 1.

FIG. 17 is a frequency response curve for application of the comb filter 140 shown in FIG. 1. As explained previously, in some instances a mix between the high frequency luma (in-phase every line) and the modulated chroma (out-of-phase every other line) is processed by the adaptive comb filter 140. There are usually instances in a normal moving composite video input signal 102 in which there will be a sharp transition of the luma (which generated high frequencies) with a transition of chroma. In these instances, it may sometimes be difficult to recognize how to comb at the transition with the surrounding lines. For these instances, the adaptive comb filter 140 determines the comparison at or near zero for several samples before the transition, the comparison will be determined to be relatively high for several subsequent samples, and then back to or near zero after the transition. This type of luma edge processing tends to minimize the above phenomenon. In these instances, a comparison signal will have a variation that is relatively faster than the composite video input signal 102 itself, limited in bandwidth to a maximum of approximately 5.5 MHz.

Another aspect of the invention is to detect and erode these impulses. A median filter can be used when an associated window is sufficiently sized. In some instances, median filters are relatively expensive to implement if a sized window is larger than three samples. In other instances, a median filter is symmetrical and the filter is only needed to process a positive spike. In most instances, a median filter between average values before and after the spike and the current value (at the spike) can be used. The minimum between the current sample and the output of the median filter is selected to minimize or otherwise eliminate the positive spike and to preserve any regular edges.

The frequency response curve shown in FIG. 17 can be represented mathematically as follows:

(MATLAB CODE)

e=zeros(1,100); e(1,1:50)=10; e(1,1:65)=10; e(1,78:100)=10; e=zeros(1,100);

e(1,1:50)=10;

e(1,30)=0; e(1,65)=10; e(1,75:100)=10; e=filtre(filtre(filtre(e,[0.25 0.5]),[0.25 0.5]),[0.25 0.5]);

m=min(e(1,11:90),median([filtre(e(1,6:85),[1/8 1/4 1/4]); e(1,11:90)

filtre(e(1,16:95),[1/8 1/4 1/4])]',2)');

plot(11:90,e(11:90),'k',11:90,m,'r'); zoom on;

The frequency response plot in FIG. 17 shows such a function where an input is 1700 and an output is 1702 with the average filter being: [1/8 1/4 1/4 1/4 1/8]. The regular edges around 50 and 75 are preserved and only the positive spike around 65 is reduced. A three-sample window minimum function which replaces the middle sample by the minimum between the middle sample, the one before and the one after can often be used in morphological filtering to improve the result. Furthermore, the output can be slightly filtered to avoid any sharp transitions in the above functions.

Post-Processing: Adaptive Reduction of Chroma Bandwidth

Figure 18:
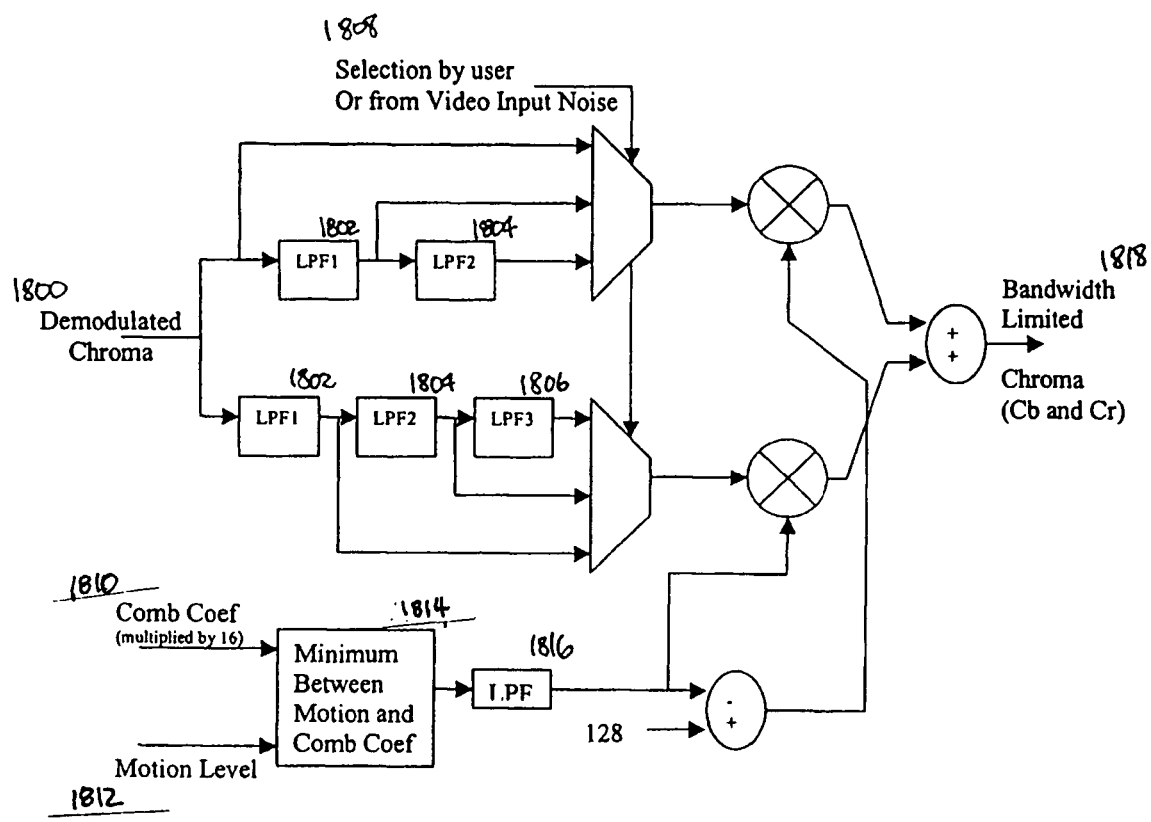
FIG. 18 is another signal flow diagram for an embodiment of the comb filter system shown in FIG. 1.

FIG. 18 is a another signal flow diagram for the comb filter system 100 shown in FIG. 1. Typically, a human eye is naturally less sensitive to chroma resolution than to luma resolution in a displayed video signal. This relative sensitivity is one reason why the chroma is usually coded with about one half of the bandwidth as luma in the various video standards such as NTSC and PAL. This relative sensitivity is also the case when there is motion encoded in a video signal. However, cross color chroma artifacts are a common problem in conventional comb filters, and especially difficult signals to decode are those signals with motion encoded in the video signal. Another aspect of the invention reduces the chroma bandwidth when the composite video input signal 102 cannot be combed by the comb filter 140 because of motion, and further reduces the chroma bandwidth when it is uncertain whether the comb filter 140 will properly separate luma and chroma. The more motion that is detected by the adaptive comb filter 140 in accordance with the invention, the less bandwidth that is maintained or kept.

FIG. 18 illustrates an exemplary fading circuit for processing between different spectrums for chroma depending on the motion encoded in the video signal. As shown in line 1800, the chroma is previously demodulated. Typically, chroma is filtered by a demodulation low pass filter such as "LPFDemod." The demodulated chroma passes through at least one or a series of filters 1802, 1804, and 1806 with decreasing bandwidth, such as "LPF1," "LPF2," and "LPF3." The fading performed through at least one or a series of filters 1802, 1804, and 1806 is from a relatively "wide" filter to a relatively narrow filter. For instance, a user or the adaptive comb filter 140 can select to fade from "LPF1" 1802 when there is no motion when motion Level=0 to "LPF3" 1806 when there is full motion when motion level=128. Alternatively, the user or the adaptive comb filter 140 can select to fade from "LPFDemod" when there is no motion to "LPF2" 1804 when there is full motion. The selection of a particular or series of filters 1802, 1804, and 1806 can depend on the particular type of video application or display device 160. For example, if a user desired to preserve as much of the integrity of the signal in a MPEG2 encoder, he or she could decide or otherwise select or instruct the adaptive comb filter 140 not to select too narrow of a filter.

Further, the adaptive comb filter 140 can modify the filtered chroma signal using a previously determined result. As shown in 1808, the filtered chroma signal can be modified or otherwise adjusted by any measured video input noise. In another instance shown in 1810, if the adaptive comb filter 140 failed to find any correlation with surrounding out-of-phase lines, the signal "Comb Coef" will be equal to zero, and the filtered chroma signal can be narrowed accordingly. Further, as shown by 1812, the filtered chroma signal can be reduced even if the motion level is not completely zero. As described above, the filtered chroma signal can be reduced by selecting the minimum between Comb Coef 1810 expressed between 0 and 128 in this case so it was multiplied by 16 from "ΣXi" and Motion Level 1812 also between 0 and 128. To avoid any sharp transition, the output of the minimum selection is slightly filtered by a low pass filter (LPF) 1816 which has a simple impulse response, for instance [0.25 0.5 0.25]. In any instance, the resulting signal is a bandwidth limited chroma signal 1818.

Figure 19A:
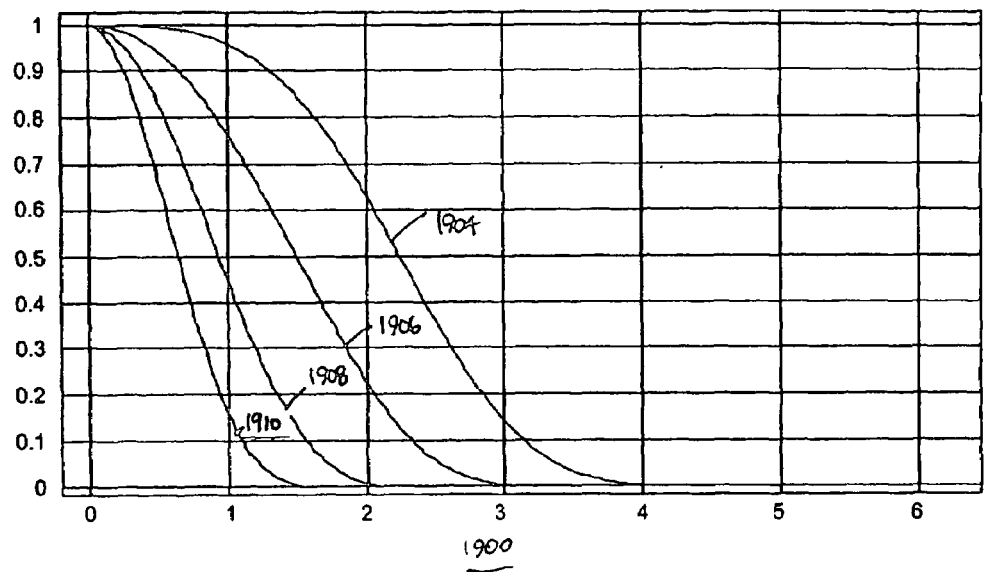
FIGS. 19A and 19B are a set of frequency response curves for various chroma demodulation filters for an embodiment of the comb filter shown in FIG. 1.
Figure 19B:
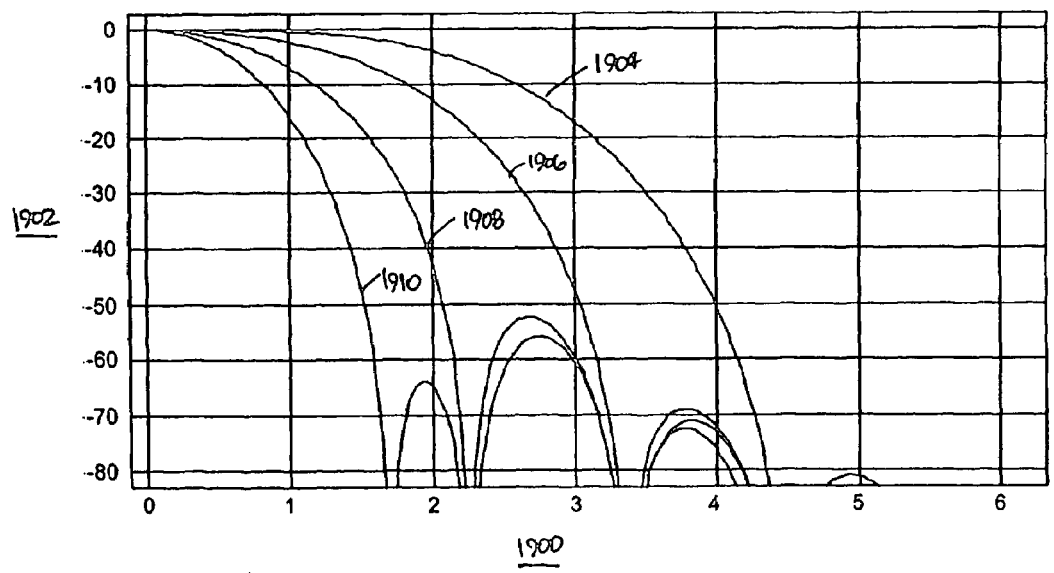

FIGS. 19A and 19B are a set of frequency response curves for various chroma demodulation filters for the comb filter 140 shown in FIG. 1. As shown in FIGS. 19A and 19B, each filter provides a different frequency response. Note that the three responses correspond to low pass filters 1802, 1804, and 1806 illustrated in FIG. 18 and low pass filters 170, 172, and 174 described and illustrated in FIG. 1. The X axis 1900 of each figure represents frequencies in MHz, and FIG. 19B is plotted with log scale for the Y axis 1902. Frequency response curve 1904 is from an exemplary demodulation filter. Frequency response curve 1906 is from an exemplary LPF1 filter. Frequency response curve 1908 is from an exemplary LPF2 filter. Frequency response curve 1910 is from an exemplary LPF3 filter.

The foregoing description of the preferred embodiments of the invention has been presented only for the purpose of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated.

The invention we claim is:

1. A method for separating a digitized composite video signal into a luminance component and a chrominance component, comprising:

generating a plurality of delayed signals from the digitized composite video signal;

selecting one of the delayed signals as a reference signal;

selecting a second one of the delayed signals as a first comparison signal;

comparing the reference signal with the first comparison signal to obtain first comparison results, wherein the first comparison results include a first degree of motion that characterizes any motion of an object associated with an image corresponding to the reference signal and an image corresponding to the first comparison signal;

comparing the comparison results to a threshold, wherein the threshold is adaptive based on at least one measured parameter of the digitized composite video signal;

selecting a third one of the delayed signals as a second comparison signal;

comparing the reference signal with the second comparison signal to obtain second comparison results, wherein the second comparison results include a second degree of motion that characterizes any motion of the object associated with the image corresponding to the reference signal and an image corresponding to the second comparison signal;

comparing the second comparison results to the threshold; and if the first and second comparison results satisfy the threshold, then combing the reference signal to obtain the luminance component and the chrominance component by combining at least a portion of one of the delayed signals with the reference signal, wherein the portion of the one of the delayed signals is determined by the comparison results.

2. The method of claim 1, wherein the first degree of motion indicates a comb direction.

3. The method of claim 2, wherein if the first degree of motion indicates no motion or a low degree of motion, then the comb direction is frame combing.

4. The method of claim 2, wherein if the first degree of motion indicates a high degree of motion, then the comb type is line combing.

5. The method of claim 1, wherein the first comparison signal is an advance of the reference signal.

6. The method of claim 1, wherein the first comparison signal is a delay of the reference signal.

7. The method of claim 1, wherein the at least one measured parameter is video input noise.

8. The method of claim 1, wherein the at least one measured parameter is video signal rise time.

9. The method of claim 1, wherein, combing the reference signal further comprises:
combining at least a portion of a second one of the delayed signals with the reference signal, wherein the portion of the second one of the delayed signals is determined by the comparison results.

10. The method of claim 1, further comprising:
if the first and second comparison results do not satisfy the predetermined threshold, then determining whether the first and second comparison results indicate partial combing; and
if partial combing is indicated, then processing the reference signal using partial combing combined with a combing alternative.

11. The method of claim 10, wherein the combing alternative is chrominance bandwidth reduction.

12. The method of claim 10, wherein the combing alternative is luminance bandwidth reduction.

13. The method of claim 12, wherein the luminance bandwidth reduction includes using a trap filter.

14. The method of claim 12, wherein the luminance bandwidth reduction includes using at least one bandsplit filter.

15. The method of claim 1, wherein the first comparison signal is two frames delayed from the reference signal and the second comparison signal is one frame delayed from the reference signal.

16. The method of claim 1, wherein one of the delayed signals is selected from the group consisting of: one frame delayed from the reference signal, one line above the reference signal, one line below the reference signal and one field delayed from the reference signal.

17. The method of claim 1, wherein one of the delayed signals is selected from the group consisting of: one frame delayed from the reference signal, two frames delayed from the reference signal, one line above the reference signal two lines above the reference signal, one line below the reference signal, two lines below the reference signal, one field delayed from the reference signal and two fields delayed from the reference signal.

* * * * *